(12) United States Patent
Ishikawa et al.

(10) Patent No.: US 8,832,380 B2
(45) Date of Patent: *Sep. 9, 2014

(54) STORAGE SYSTEM HAVING CACHE PARTITION SIZE SET BASED ON DRIVE TYPE

(71) Applicant: Hitachi, Ltd., Tokyo (JP)

(72) Inventors: Atushi Ishikawa, Odawara (JP); Yuko Matsui, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/098,666

(22) Filed: Dec. 6, 2013

(65) Prior Publication Data

US 2014/0095793 A1    Apr. 3, 2014

Related U.S. Application Data

(63) Continuation of application No. 11/976,645, filed on Oct. 26, 2007, now Pat. No. 8,612,716, which is a continuation of application No. 11/110,883, filed on Apr. 21, 2005, now Pat. No. 7,447,843.

(30) Foreign Application Priority Data

Feb. 15, 2005 (JP) ................................. 2005-037347

(51) Int. Cl.
   *G06F 12/02*      (2006.01)
   *G06F 12/08*      (2006.01)
   *G06F 12/12*      (2006.01)

(52) U.S. Cl.
   CPC ...... *G06F 12/0875* (2013.01); *G06F 2212/282* (2013.01); *G06F 12/084* (2013.01); *G06F 12/121* (2013.01); *G06F 2212/261* (2013.01); *G06F 12/0873* (2013.01)
   USPC ........................................................ 711/129

(58) Field of Classification Search
   USPC ........................................................ 711/129
   See application file for complete search history.

(56) References Cited

U.S. PATENT DOCUMENTS

| 4,425,615 A | 1/1984 | Swenson et al. |
| 4,503,501 A | 3/1985 | Coulson et al. |

(Continued)

FOREIGN PATENT DOCUMENTS

| EP | 1061449 | 12/2000 |
| JP | 4370571 | 12/1992 |

(Continued)

OTHER PUBLICATIONS

D. Thiebaut, et al., "Improving Disk Cache Hit-Ratios Through Cache Partitioning", IEEE Transactions on Computers, IEEE Service Center, vol. 41, No. 6, Jun. 1, 1992, pp. 665-676.

*Primary Examiner* — John Lane
(74) *Attorney, Agent, or Firm* — Mattingly & Malur, PC

(57) ABSTRACT

An object of the present invention is to provide a storage system which is shared by a plurality of application programs, wherein optimum performance tuning for a cache memory can be performed for each of the individual application programs. The storage system of the present invention comprises a storage device which provides a plurality of logical volumes which can be accessed from a plurality of application programs, a controller for controlling input and output of data to and from the logical volumes in response to input/output requests from the plurality of application programs, and a cache memory for temporarily storing data input to and output from the logical volume, wherein the cache memory is logically divided into a plurality of partitions which are exclusively assigned to the plurality of logical volumes respectively.

16 Claims, 19 Drawing Sheets

(56) References Cited

U.S. PATENT DOCUMENTS

| | | | |
|---|---|---|---|
| 5,437,022 A | 7/1995 | Beardsley et al. |
| 5,519,831 A | 5/1996 | Holzhammer |
| 5,568,629 A | 10/1996 | Gentry et al. |
| 5,574,855 A | 11/1996 | Rosich et al. |
| 5,680,579 A | 10/1997 | Young et al. |
| 5,717,893 A | 2/1998 | Mattson |
| 5,805,788 A | 9/1998 | Johnson |
| 5,966,729 A | 10/1999 | Phelps |
| 6,151,660 A | 11/2000 | Aoki |
| 6,223,256 B1 | 4/2001 | Gaither |
| 6,347,358 B1 | 2/2002 | Kuwata |
| 6,356,978 B1 | 3/2002 | Kobayashi et al. |
| 6,591,335 B1 | 7/2003 | Sade et al. |
| 6,799,244 B2 | 9/2004 | Tanaka et al. |
| 6,880,059 B2 | 4/2005 | Mizuno et al. |
| 6,944,711 B2 | 9/2005 | Mogi et al. |
| 7,127,585 B2 | 10/2006 | Shimada et al. |
| 7,159,075 B2 | 1/2007 | Moro |
| 7,302,522 B2 | 11/2007 | Khan et al. |
| 7,363,451 B2 | 4/2008 | Kolli et al. |
| 7,512,736 B1 | 3/2009 | Overby |
| 7,774,545 B2 | 8/2010 | Delaney et al. |
| 7,895,398 B2 | 2/2011 | Shet et al. |
| 8,250,390 B2 | 8/2012 | Takada et al. |
| 8,271,757 B1 | 9/2012 | Chatterjee et al. |
| 2001/0037433 A1 | 11/2001 | Dempsey et al. |
| 2002/0078300 A1 | 6/2002 | Dharap |
| 2002/0184442 A1 | 12/2002 | Veitch et al. |
| 2003/0093647 A1 | 5/2003 | Mogi et al. |
| 2003/0204671 A1 | 10/2003 | Matsunami et al. |
| 2004/0162926 A1 | 8/2004 | Levy |
| 2004/0205296 A1 | 10/2004 | Bearden |
| 2005/0160249 A1 | 7/2005 | Sankruthi |
| 2005/0223168 A1 | 10/2005 | Ohmura |
| 2006/0143379 A1 | 6/2006 | Khan et al. |
| 2011/0167212 A1 | 7/2011 | Lowe et al. |

FOREIGN PATENT DOCUMENTS

| | | |
|---|---|---|
| JP | 6110741 | 4/1994 |
| JP | 6222988 | 8/1994 |
| JP | 7104940 | 4/1995 |
| JP | 9146842 | 6/1997 |
| JP | 9215026 | 8/1997 |
| JP | 10301847 | 11/1998 |
| JP | 1196074 | 9/1999 |
| JP | 11312058 | 11/1999 |
| JP | 2000187617 | 7/2000 |
| JP | 2000216969 | 8/2000 |
| JP | 2001101076 | 4/2001 |
| JP | 2001166993 | 6/2001 |
| JP | 2002251322 | 9/2002 |
| JP | 2003131818 | 5/2003 |
| JP | 2003162377 | 6/2003 |
| JP | 2003530622 | 10/2003 |
| JP | 200486505 | 3/2004 |
| JP | 2004295790 | 10/2004 |
| WO | 0188720 | 11/2001 |
| WO | 2004042505 | 5/2004 |

FIG.3
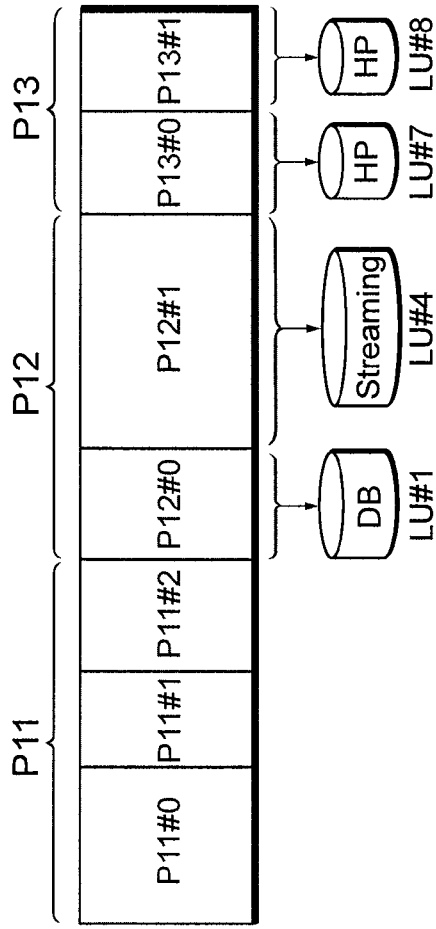
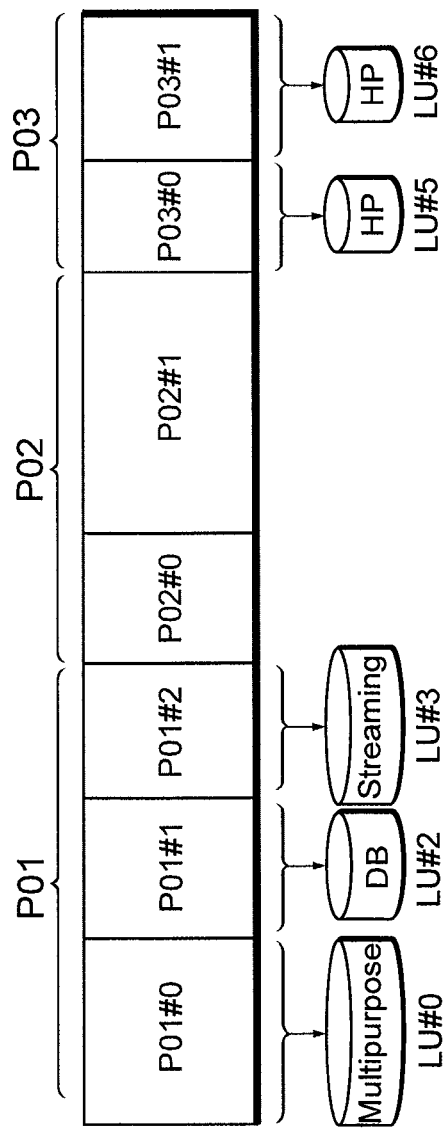

| LUN | PARTITION NUMBER |
|---|---|
| L U # 0 | P 0 1 # 0 |
| L U # 1 | P 1 2 # 0 |
| L U # 2 | P 0 1 # 1 |
| ⋮ | ⋮ |

FIG.14

| | | CACHE PARTITION | |
|---|---|---|---|
| ─■DF700M.70012345 | | ITEM | COMMENT |
| ├■RAID GROUPS | ■ | PARTITION | REFER TO AND MAKE SETTINGS FOR CACHE |
| ├■HOST GROUPS | ■ | LOGICAL UNIT | ASSIGN CACHE PARTITIONS TO LOGICAL UNITS |
| ├■ACCESS MODE | | | |
| ├■SPARE DRIVE | | | |
| ├■DIFFARANTLAL MANAGEMENT | | | |
| ├■COMMAND DEVICE | | | |
| ├■LICENSE KEY | | | |
| ├■SHADAWIMAGE | | | |
| ├■TRUECOPY | | | |
| ├■LUN EXPANSION | | | |
| ├■FLASH ACCESS | | | |
| ├■[CACHE PARTITION] | | | |
| ├■ PARTITION | | | |
| ├■ LOGICAL UNIT | | | |

FIG.15

─■DF700M.70012345
├■RAID GROUPS
├■HOST GROUPS
├■ACCESS MODE
├■SPARE DRIVE
├■DIFFARANTLAL MANAGEMENT
├■COMMAND DEVICE
├■LICENSE KEY
├■SHADAWIMAGE
├■TRUECOPY
├■LUN EXPANSION
├■FLASH ACCESS
├■ CACHE PARTITION
├■[PARTITION]
├■ LOGICAL UNIT

CURRENT VALUE
(TOTAL CACHE CAPACITY 2040 MB, AVAILABLE CACHE CAPACITY 0MB)

| | NO. | NAME | CTL | PARTITION SIZE | SEGMENT SIZE |
|---|---|---|---|---|---|
| ■ | 00 | MASTER0 | 0 | 1020MB | 16KB |
| ■ | 01 | MASTER1 | 1 | 1020MB | 16KB |

SETTING VALUE
(TOTAL CACHE CAPACITY 2040 MB, AVAILABLE CACHE CAPACITY 890 MB)

| | NO. | NAME | CTL | PARTITION SIZE | SEGMENT SIZE |
|---|---|---|---|---|---|
| ■ | 00 | MASTER0 | 0 | 400MB | 16KB |
| ■ | 01 | MASTER1 | 1 | 500MB | 16KB |
| ■ | 02 | SAMPLE | 0 | 150MB | 8KB |
| ■ | 03 | TEST | 0 | 100MB | 64KB |

[CHANGE]

FIG.16

CACHE PARTITION

TOTAL CACHE CAPACITY: 2040MB
AVAILABLE CACHE CAPACITY: 890MB

| NO. | NAME | CTL | PARTITION SIZE(×10KB) | SEGMENT SIZE |
|-----|---------|-----|----------------------|--------------|
| 00  | MASTER0 | 0 ▼ | 40                   | 16KB         |
| 01  | MASTER1 | 1 ▼ | 50                   | 16KB         |
| 02  | SAMPLE  | 0 ▼ | 15                   | 8KB ▼        |
| 03  | TEST    | 0 ▼ | 10                   | 64KB ▼       |

[ADD] [DELETE]    [OK] [CANCEL]

FIG.17

- ■ DF700M.70012345
  - ■ RAID GROUPS
  - ■ HOST GROUPS
  - ■ ACCESS MODE
  - ■ SPARE DRIVE
  - ■ DIFFARANTLAL MANAGEMENT
  - ■ COMMAND DEVICE
  - ■ LICENSE KEY
  - ■ SHADAWIMAGE
  - ■ TRUECOPY
  - ■ LUN EXPANSION
  - ■ FLASH ACCESS
  - ■ CACHE PARTITION
    - ■ PARTITION
    - ■ LOGICAL UNIT

LOGICAL UNIT

| LUN | CACHE PARTITION | CAPACITY | RAID GROUP | RAID LEVEL |
|-----|-----------------|----------|------------|------------|
| ■ 0000 | 00:MASTER0   | 100GB    | 00         | RAID5(4D+1) |
| ■ 0001 | 02:SAMPLE    | 10GB     | 00         | RAID5(4D+1) |

[CHANGE]

FIG.18

| ASSIGNING CACHE PARTITION | | | | |
|---|---|---|---|---|
| LUN | CACHE PARTITION | CAPACITY | RAID GROUP | RAID LEVEL |
| 0000 | 00:MASTER0 | 100GB | 00 | RAID5(4D+1) |
| 0001 | 02:SAMPLE | 10GB | 00 | RAID5(4D+1) |

[CHANGE ASSIGNMENT]

[OK] [CANCEL]

FIG.19

CHANGE CACHE PARTITION

| LOGICAL UNIT NUMBER | 0000  0001 |
|---|---|
| CACHE PARTITION | 00:MASTER0 ▼<br>PARTITION SIZE: 500MB<br>SEGMENT SIZE: 16KB |

[OK] [CANCEL]

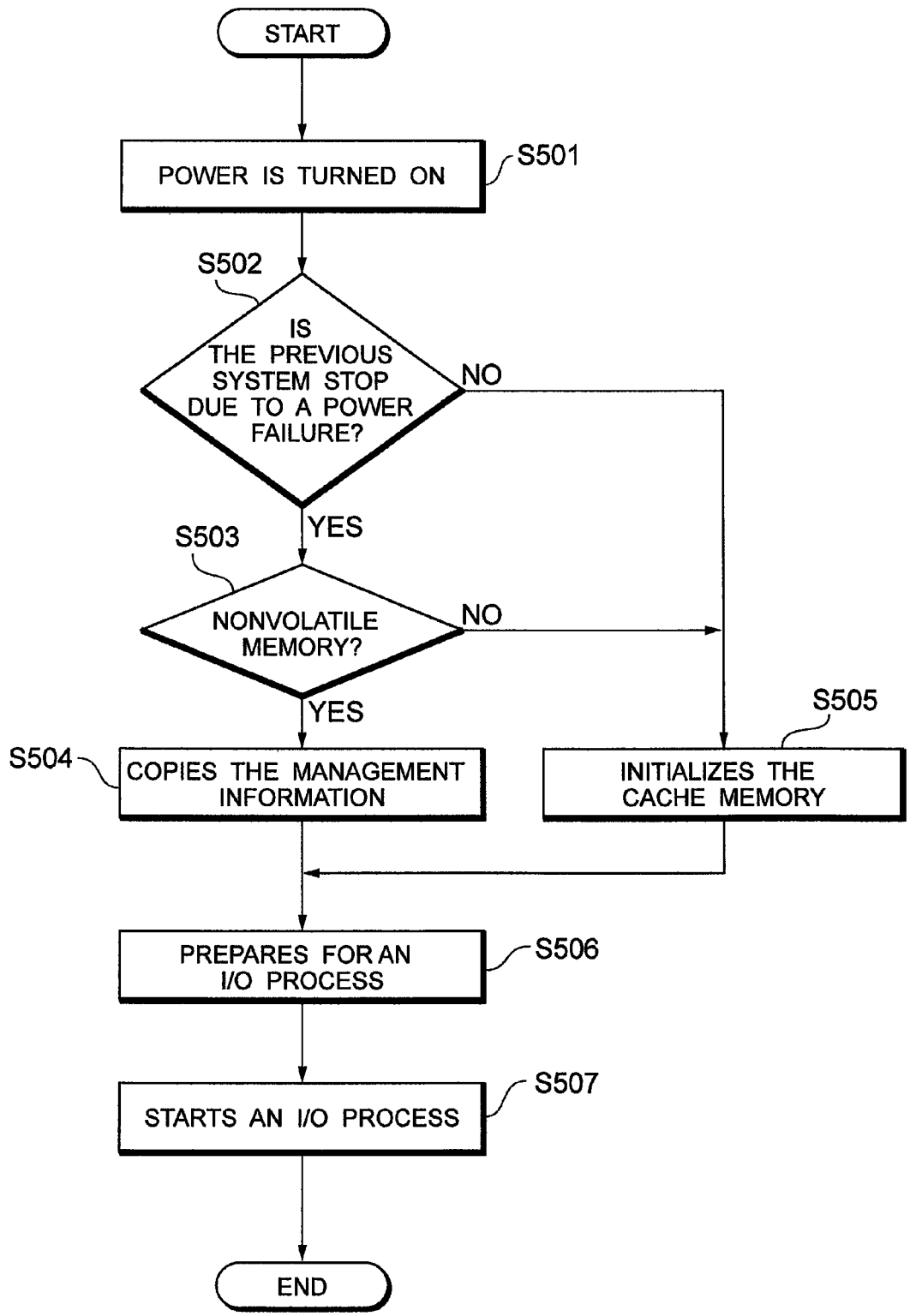

STORAGE SYSTEM HAVING CACHE PARTITION SIZE SET BASED ON DRIVE TYPE

CROSS-REFERENCES TO RELATED APPLICATIONS

The present application is a continuation of application Ser. No. 11/976,645, filed Oct. 26, 2007 which is a continuation of application Ser. No. 11/110,883, filed Apr. 21, 2005; which relates to and claims priority from Japanese Patent Application No. 2005-037347, filed on Feb. 15, 2005, the entire disclosure of which is incorporated here in reference.

BACKGROUND OF THE INVENTION

1. Field of the Invention

The present invention relates to a storage system which can optimize performance tuning of a cache memory for each of a plurality of application programs.

2. Description of the Related Art

Recently, storage consolidation where storages dispersed in each server are consolidated in a single place and connected to servers via a storage-dedicated network such as a SAN (Storage Area Network) has been widely used. As an operation pattern of the storage consolidation, common use of a storage system by a plurality of application programs or contents has been increasing. The storage system is configured with, for example, a disk array device and the like. A disk array device is configured by disposing numbers of disk drives in an array, and is constructed on the basis of, for example, RAID (Redundant Array of Independent Inexpensive Disks). On a physical storage region provided by the group of disk drives, at least one or more logical volumes are formed that are provided to a host device. The host device can read and write data for the logical volumes by issuing a write command or read command to the storage system.

In this type of storage system, a cache memory for temporarily storing write data for writing data into a disk drive or read data for reading data from the disk drive is mounted, to realize high speed I/O processing for the host device (For example, Japanese Patent Application Laid-Open No. 2001-166993). For example, regarding a write access to the disk drive from the host device, completion of write processing is notified to the host device in response to writing of the write data into the cache memory, and destage is performed after a certain amount of cache data is accumulated. Regarding a read access to the disk drive from the host device, when the read data hits the cache memory, a high-speed access is realized by reading the read data from the cache memory.

SUMMARY OF THE INVENTION

However, since the I/O characteristics of each application program differ, it is necessary to optimize performance tuning of the cache memory (for example, setting of the segment size, necessity of dual writing (mirror writing) between controllers, etc.) in accordance with the I/O characteristics.

For example, as with an application program which performs streaming delivery of the contents of an moving image, a still image or the like, for such application program for consecutively processing large quantities of data, it is preferred that the segment size of the cache memory be set large and that the overhead be reduced. On the other hand, for an application program in which a fine access such as a database is issued randomly, it is preferred that the segment size be set small and the overhead be reduced.

Further, for example, as in an online service in a bank, for an application program in which high reliability is required, it is necessary to duplicate the cache data to securely save the data in case of trouble. On the other hand, as in a temporary simulation such as weather prediction etc. or scientific and engineering calculations, when performing calculation on the basis of source data which is saved using another method, securing the performance of the calculation is often a center of focus rather than securing high reliability by dual writing the data to the cache memory, for saving a half-way calculation result (temporary data or the like).

In a conventional storage system, performance tuning for judging necessity of segment size settings or of dual writing in accordance with the I/O characteristics for each application program could not be performed, thus in a storage system which is shared by a plurality of application programs, when performing tuning for a cache memory which is optimum to a certain application program, there occurred a problem that the performances of other application programs decrease. For example, when setting the segment size large for an application program which provides a streaming service, the application program such as a database is lowered in the percent of hit rate of the cache memory.

Moreover, in the storage system which is shared by a plurality of application programs, a resource conflict between the application programs could be generated, thus it is necessary to inhibit the resource conflict to appropriately bring the performance of each application program into action. For example, in the storage system which is shared by a plurality of application programs having different loads, more writing is performed from an application program having a high load, thus the cache memory is filled with the data of the high load application program, and a resource conflict with other application program may be generated.

Such a resource conflict could be generated not only between a plurality of application programs having different I/O characteristics but also between a plurality of disk drives having different performance characteristics. For example, in a storage system which has mixed loads of a fiber channel disk drive and ATA (Advanced Technology Attachment) disk drive, it takes longer time for access in the ATA disk drive than the fiber channel disk drive, thus the time required in destaging from the cache memory to the ATA disk drive is longer than the time required in destaging from the cache memory to the fiber channel disk drive. Consequently, the time taken for the data of the application program that uses the ATA disk drive to accumulate in the cache memory becomes long by that much, thus the data of the ATA disk drive is accumulated in the cache memory, thereby generating a resource conflict.

The present invention is contrived in the light of the problems described above, and one of the objects of the present invention is to provide, in a storage system which is shared by a plurality of application programs, a storage system which can optimize performance tuning of a cache memory for each application program.

Another object of the present invention is to provide, in a storage system which is shared by a plurality of application programs, a storage system which inhibits performance deterioration caused by a resource conflict of a cache memory between a plurality of application programs having different I/O characteristics or between a plurality of storage devices having different performance characteristics.

In order to solve the above problems, the storage system of the present invention comprises a storage device for providing a plurality of logical volumes which can be accessed from a plurality of application programs, a controller for controlling input and output of data to and from the logical volumes in response to input/output requests from the plurality of application programs, and a cache memory for temporarily storing the data input and output to and from the logical volumes, wherein the cache memory is logically divided into a plurality of partitions assigned exclusively for the plurality of logical volumes.

For each of the plurality of logical volumes, by assigning each of the plurality of partitions exclusively, a resource conflict between the logical volumes assigned exclusively to the respective application programs is inhibited, whereby performance tuning of an optimum cache memory can be performed.

Even when the performance characteristics of the storage device are different, by assigning the plurality of partitions exclusively to the plurality of logical volumes respectively, the resource conflict of the cache memory, which is caused by the difference in the performance characteristics of the storage device, is inhibited, and performance tuning of an optimum cache memory can be performed.

BRIEF DESCRIPTION OF THE DRAWINGS

FIG. 3 is a figure which shows a correspondence of each partition to a logical volume;

FIG. 14 is an example of a unit screen display;

FIG. 15 is an example of reference/change screen display of a partition;

FIG. 16 is an example of display of partition change screen;

FIG. 17 is an example of display of a setting screen for partition assignment for a logical volume;

FIG. 18 is an example of display of a partition assignment change screen;

FIG. 19 is an example of display of a partition specification screen;

FIG. 23 is a flow chart for a recovery processing routine in case of a power failure.

DESCRIPTION OF THE PREFERRED EMBODIMENTS

Embodiments of the present invention will now be described with reference to each figure. Each embodiment is not to limit the patent claims, and all the characteristics described in the embodiments are not necessarily required for means of solution.

[Embodiment 1]

Figure 1:
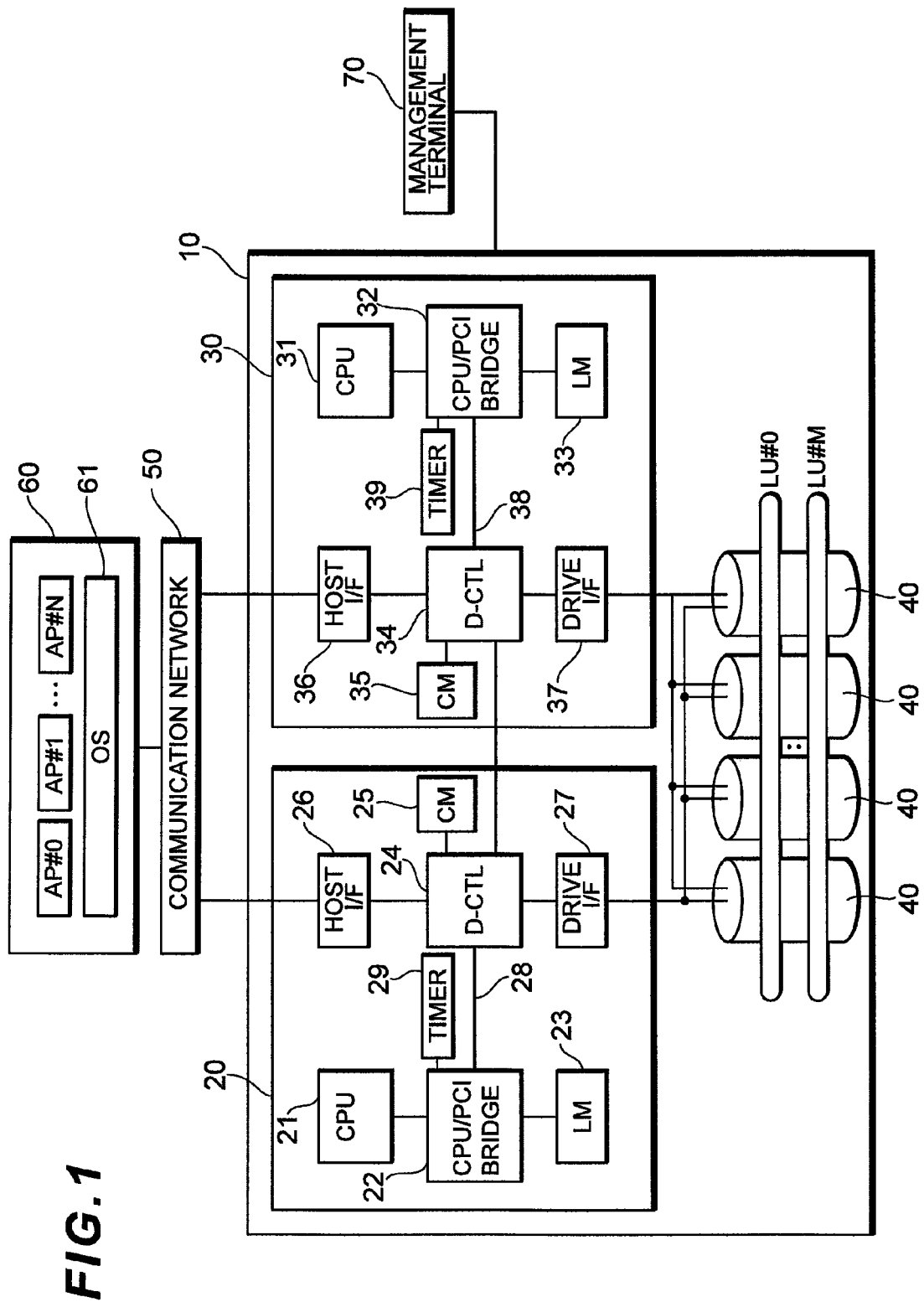
FIG. 1 is a block diagram which shows a main configuration of a storage system.

FIG. 1 shows a main configuration of the storage system according to the present embodiment.

A storage system 10 is connected to one or a plurality of host devices 60 via a communication network 50. The host device 60 is a server device, personal computer, workstation, main frame, or the like which functions as a higher-level device of the storage system 10. The host device 60 has mounted therein a plurality of application programs AP#0, AP#1, . . . , AP#N that are operated on an OS (Operating System) 61. A storage resource provided by the storage system 10 is shared by the plurality of application programs AP#0, AP#1, . . . , AP#N.

Examples of the communication network 50 include, for example, a SAN (Storage Area Network), LAN (Local Area Network), Internet, dedicated circuit, public circuit, and the like. When the host device 60 is connected to the storage system 10 via a SAN, the host device 60 requests data input/output by a block which is a data executive unit of the storage system 10 in accordance with a fiber channel protocol. When the host device 60 is connected to the storage system 10 via a LAN, the host device 60 specifies a file name and requests data input/output, file by file by a protocol such as an NFS (Network File System), iSCSI (internet Small Computer System Interface) or the like. In order for the storage system 10 to receive a file access request from the host device 60, it is necessary to load a NAS (Network Attached Storage) function.

The storage system 10 employs a dual controller configuration comprising controllers 20, 30 that are doubled, and comprises a plurality of disk drives 40 as storage devices provided to the plurality of application programs AP#0, AP#1, . . . , AP#N. For the disk drives 40, a plurality of disk drives having different performance characteristics, such as, for example, a fiber channel disk drive, serial ATA disk drive, parallel ATA disk drive, SCSI disk drive and the like, or one of these disk drives may be used. Here, "performance characteristics" means, for example, an access speed or the like for the disk drive.

Besides these disk drives, an optical disk, semiconductor memory, magnetic tape, flexible disk or the like may be employed as the storage device.

The controller 20, 30 can control the plurality of disk drives 40 at a RAID level (0, 1, 5, for example) which is defined by a so called RAID formula. In the RAID formula, the plurality of disk drives 40 are managed as a single RAID group. A plurality of logical volumes as an access unit from the host device 60 are defined in the RAID group. An identifier LU#0, LU#1, . . . , LU#M called "LUN (Logical Unit Number)" is given in each logical volume.

The controller 20 mainly comprises a CPU 21, CPU/PCI bridge 22, local memory (LM) 23, data transfer control section (D-CTL) 24, cache memory (CM) 25, host I/F control section 26, and drive I/F control section 27.

CPU 21 is a processor for controlling I/O processing (write access or read access) for the plurality of disk drives 40 in response to a data input/output request from the host device 60. The controller 20 comprises a timer 29, and thus is configured so as to automatically adjust the segment size of the cache memory 25 when a preset time is reached (the detail will be described later). The local memory 23 has stored therein a micro program of the CPU 21. The CPU/PCI bridge 22 connects the CPU 21, local memory 22, and data transfer control section 24 to one another. The cache memory 25 is a buffer memory which temporarily stores write data for writing data into the disk drive 40 or read data obtained by reading from the disk drive 40. The cache memory 25 has a backup power and is configured as a nonvolatile memory which prevents loss of cache data even when a power failure occurs in the storage system 10.

The data transfer control section 24 connects the CPU/PCI bridge 22, cache memory 25, host I/F control section 26, and drive I/F control section 27 to one another, and controls data transfer between the host device 60 and the disk drive 40. Specifically, when a write access from the host device 60 is made, the data transfer control section 24 writes the write data received from the host device 60 via the host I/F control section 26 into the cache memory 25, and thereafter transfers the write data to the drive I/F control section 27 in order to write asynchronously the write data into the disk drive 40. In addition, when a read access from the host device 60 is made, the data transfer control section 24 writes the read data read out from the disk drive 40 via the drive I/F control section 27 into the cache memory 25, and transfers it to the host I/F control section 26. A PCI bus 28 is wired between the data transfer control section 24 and the CPU/PCI bridge 22.

The host I/F control section 26 is a controller for controlling an interface with the host device 60, and has, for example, a function for receiving a block access request from the host device 60 made by a fiber channel protocol. The drive I/F control section 27 is a controller for controlling an interface with the disk drive 40, and has, for example, a function for controlling a data input/output request for the disk drive 40 in accordance with the protocol which controls the disk drive 40.

The controller 30 comprises a CPU 31, CPU/PCI bridge 32, local memory (LM) 33, data transfer control section (D-CTL) 34, cache memory (CM) 35, host I/F control section 36, and drive I/F control section 37, and the same configuration as the controller 20. The controller 30 comprises a timer 39, and thus is configured so as to automatically adjust the segment size of the cache memory 35 when a preset time is reached (the detail will be described later).

The data transfer control sections 24, 34 for the respective controllers 20, 30 are connected with each other through a data bus 51, and the data written into the cache memory 25 (or 35) is transferred between the data transfer control sections 24, 34 so as to be double written to the cache memory 35 (or 25) as well. Further, when the disk drive 40 is managed at a RAID level 5, the data transfer control sections 24, 34 calculate the parity data.

The storage system 10 is connected to a management terminal 70 for maintaining or managing the system. Data communication is carried out between the both on the basis of a predetermined communication protocol such as fiber channel protocol, TCP/IP, or the like. An operator can perform setting of a logical volume defined in the disk drive 70, add on or reduce the disk drives 40, change the settings of the RAID configuration (for example, change from RAID level 5 to RAID level 1), or the like by operating the management terminal 70. Moreover, as will be described later, optimum performance tuning of the individual cache memory 25, 35 (partitioning, partition size setting, segment size setting, dual writing necessity setting, assignment setting or assignment change of the logical volume for a partition, and the like) can be performed for the respective application programs AP#0, AP#1, . . . , AP#N.

Note that the management terminal 70 may be embedded inside or attached externally to the storage system 10.

Figure 2:
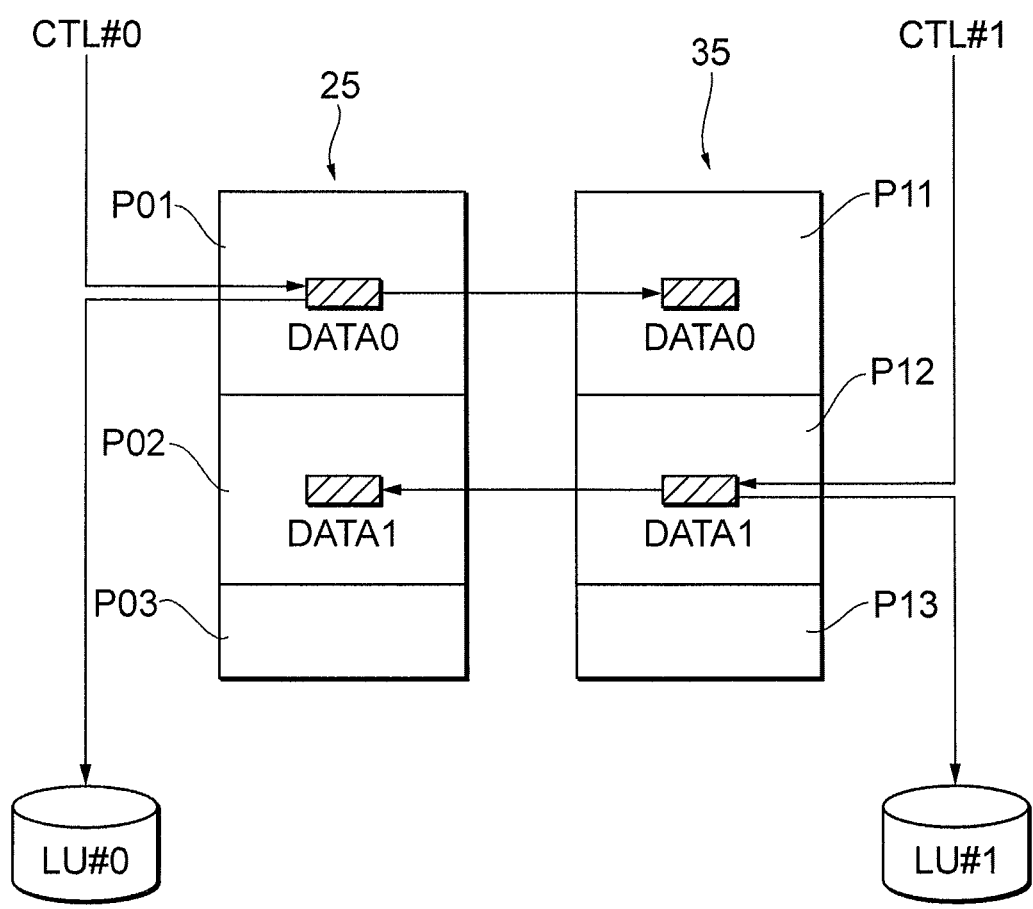
FIG. 2 is an explanatory diagram which shows dual writing of cache data.

FIG. 2 shows an outline of dual writing of the cache data by a dual controller. For the sake of explanatory convenience, in the following explanation the controller 20 is sometimes called "CTL#0", and the controller 30 is sometimes called "CTL#1". The CTL#0 and CTL#1 is each assigned a logical volume which has an authority to access exclusively. For example, CTL#0 has an authority to access LU#0 exclusively, and CTL#1 has an authority to access LU#1 exclusively. With regard to which one of the logical volumes LU#0, LU#1 is exclusively assigned to which one of CTL#0, CTL#1, each of CTL#0, CTL#1 can figure out their own access authorities by, for example, the setting information on a management information region (see FIG. 8) or the like on the cache memory 25, 35.

The cache memory 25 is divided into a plurality of storage regions P01, P02, P03, and the cache memory 35 is divided into a plurality of storage regions P11, P12, P13. The storage region P01 is a storage region for temporarily storing cache data DATA0 which is written into the logical volume assigned exclusively to CTL#0 (LU#0, for example), and dual writing setting (mirror-on setting) is conducted in this storage region P01. In other words, the cache data DATA0 written into the storage P01 is also written into the storage region P11 by control of CTL#0. The storage region P11 is a storage region for mirroring performed by CTL#0.

Similarly, the storage region P12 is a storage region for temporarily storing cache data DATA1 which is written into the logical volume assigned exclusively to CTL#1 (LU#1, for example), and dual writing setting is conducted in this storage region P12. In other words, the cache data DATA1 written into the storage P12 is also written into the storage region P02 by control of CTL#1. The storage region P02 is a storage region for mirroring performed by CTL#1.

The storage regions P03, P13 are storage regions in which the dual writing settings are not conducted (mirror-off setting).

Note that the storage regions P01, P02, P11, P12 in which the dual writing settings are applied are called "mirror-on regions" and the storage regions P03, P13 in which the dual writing settings are not applied are called "mirror-off regions".

Incidentally, the data transfer control section 24 or 34 may conduct dual writing into the cache memory 25 or 35, or the controller 20 or 30 may conduct it via a fiber channel.

FIG. 3 shows a correspondence of each partition of the cache memory to an application program and logical volume. Each of the storage regions described above (for example, P01) is logically divided into a plurality of partitions (for example, P01#0, P01#2, P01#3). The partition is a storage region for storing user data and logically divided on the cache memory, and refers to an individual storage region assigned exclusively to an individual logical volume. The term "partition" can be also called "area", "divided storage region", "divided area", "divided cache" and the like without departing from the scope. In the respective partitions, different logical volumes (for example, logical volumes to avoid a resource conflict) LU#0, LU#1, . . . , LU#M are exclusively assigned, whereby independent resource management can be performed in the cache memory 25, 35 in logical volume unit. Specifically, since a storage resource of the cache memory 25, 35, which is sued by each logical volume, is assigned in partition unit, even when the logical volume is configured by the disk drive 40 having different performance characteristics, a resource conflict occurred by the difference in the performance characteristics of the logical volumes.

By exclusively assigning a plurality of application programs AP#0, AP#1, . . . , AP#N having different I/O characteristics to the respective logical volumes LU#0, LU#1, . . . , LU#M, a resource conflict in the cache memory 25, 35 due to the difference in the I/O characteristics between the application programs AP#0, AP#1, ..., AP#N can be prevented. For example, examples such that the logical volume LU#0 used by a versatile application program to the partition P01#0, the logical volume LU#2 used by a database is assigned to the partition P01#1, and the logical volume LU#3 used by an application program for streaming is assigned to the partition P01#2 are shown.

Further, the storage region P03 as a mirror-off region is divided into partitions P03#0, P03#1, and in the respective partitions P03#0, P03#1, logical volumes LU#5, LU#6 used by an application program (HPC) which performs scientific and engineering calculations are assigned. The mirror-off region is used when dual writing is not necessary such as when temporary data is stored as in the case of a half-way calculation result of the scientific and engineering calculations.

Similarly storage regions P02, P11, P12, P13 are logically divided into a plurality of partitions.

Note that the partition division pattern (the number of partitions, partition size, and partition segment) of the storage region P11 as the mirroring region (copy destination region) of the storage region P01 (copy source region) is same as the partition division pattern of the storage region P01. Similarly, the partition division pattern of the storage region P12 as the mirroring region (copy destination region) of the storage region P02 (copy source region) is same as the partition division pattern of the storage region P12. On the other hand, the partition division patterns of the storage regions P03, P13 as the mirror-off regions do not always have to be the same, and the sizes of the storage regions P03, P13 do not always have to be the same. However, by setting the sizes of the storage regions P03, P13 to be the same, the mirror-on regions can be used efficiently.

Moreover, setting of necessity judgment for dual writing (mirror-on/mirror-off) can be performed for each partition. If the mirror-off settings are performed, cache data is not necessarily transferred between the data transfer control sections 24, 34, thus the overheads of the controllers 20, 30, which is involved in data transfer, can be reduced.

Figures 4, 5:
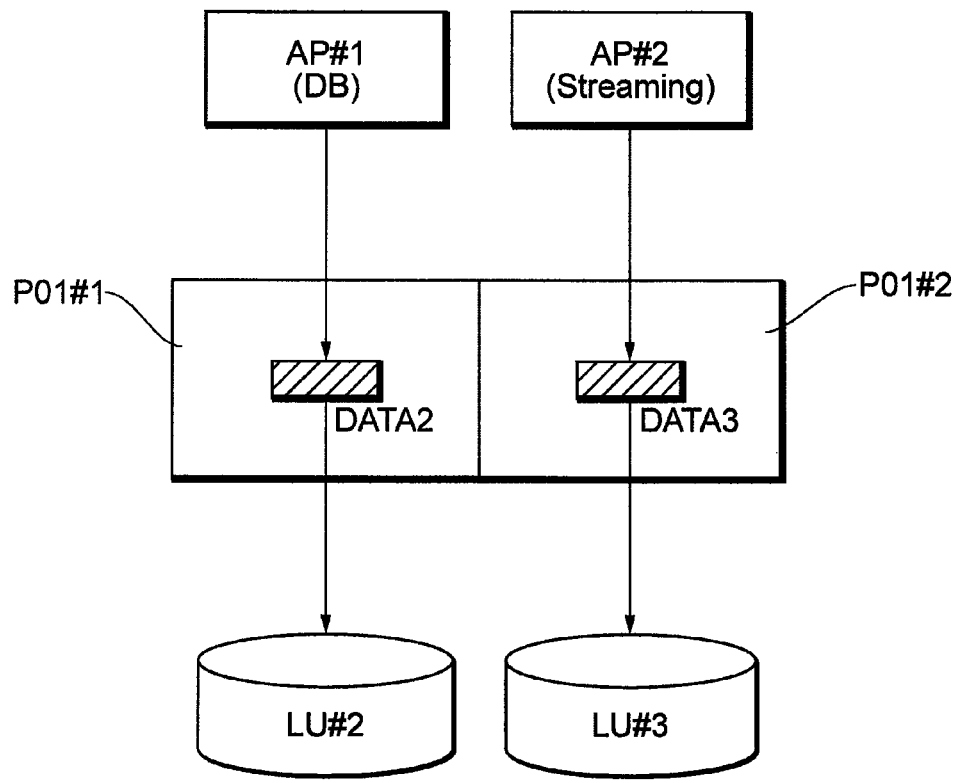
FIG. 4 is a figure which shows a correspondence of LUN to a partition number.
FIG. 5 is a figure which shows an outline in which a resource conflict is inhibited by cache partitioning.

FIG. 4 shows a correspondence of LUN to the number of partitions. This correspondence can be changed accordingly when an operator operates the management terminal 70 and instructs the storage system 10 for an allocation change in the logical volume and the partition (the detail will be described later).

FIG. 5 shows an outline in which a resource conflict is inhibited by assigning a logical volume to each partition. Cache data DATA2 written and read by the application program AP#1 into and out from the logical volume LU#2 is stored in the partition P01#1, and cache data DATA3 written and read by the application program AP#2 into and out from the logical volume LU#3 is stored in the partition P01#2. The application program AP#1 is a program which issues fine random accesses to the database and the like, while the application program AP#2 is a program such as for streaming to handle consecutive large quantities of data, thus the I/O characteristics of both largely differ. Specifically, the amounts of time that the cache data DATA2, DATA3 stored in each partition P01#1, P01#2 are different, thus a resource conflict may occur when independent source management is not provided to each partition.

However, by partitioning the cache memory and exclusively assigning a resource of the cache memory which can be used by each application program AP#1, AP#2, the cache data DATA2 of the application program AP#1 does not consume the resource of the partition P01#2. Similarly, the cache data DATA3 of the application program AP#2 does not consume the resource of the partition P01#1. Accordingly, the load of a single application program spreads over the entire cache memory, whereby a resource conflict can be prevented from being caused.

Note that even when the performance characteristics of the disk drives configuring the logical volumes LU#2, LU#3, a resource conflict can be inhibited for the same reason.

Figure 6:
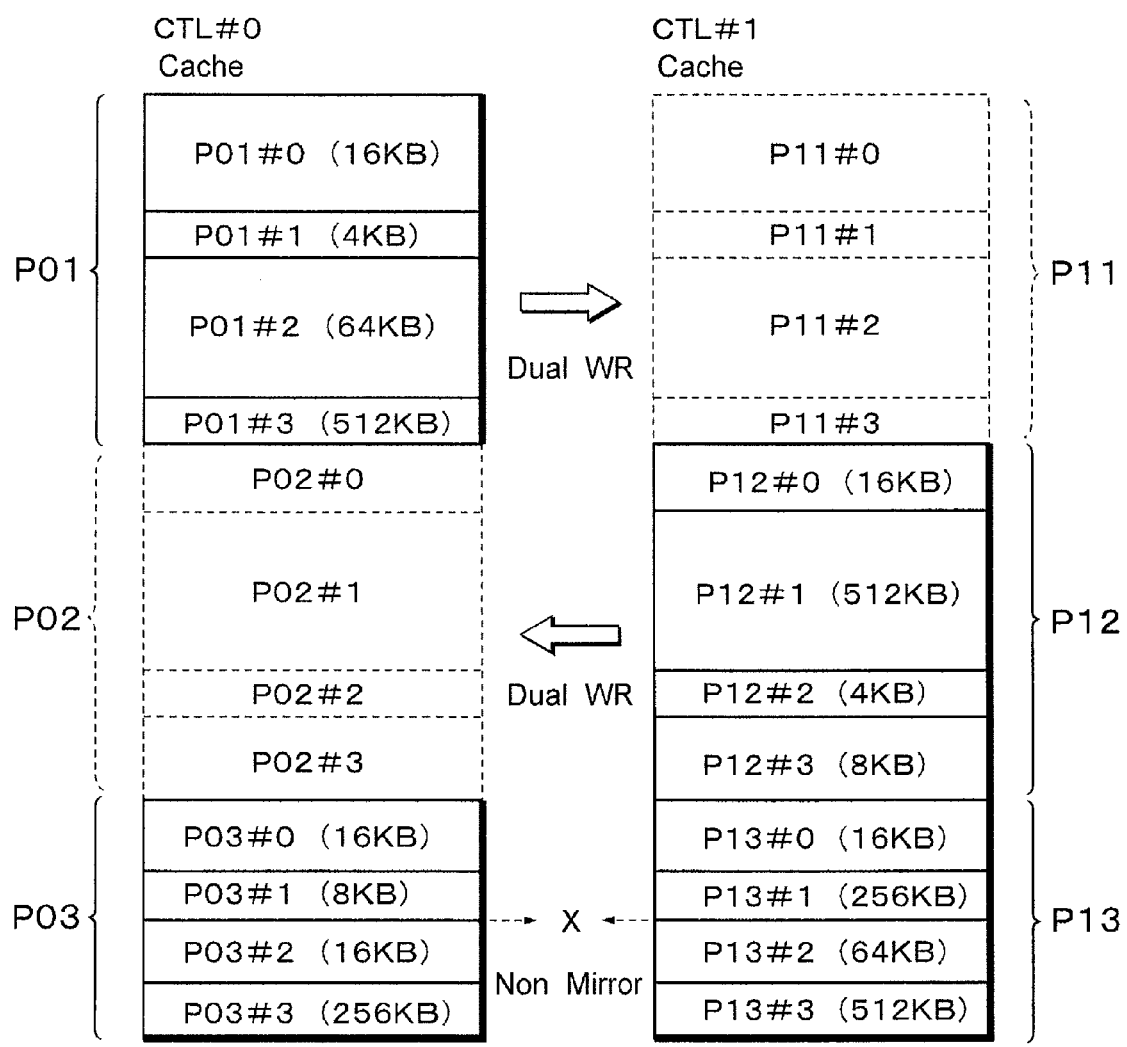
FIG. 6 shows a logical configuration of each partition.

FIG. 6 shows a logical configuration of a partition. It illustrates an example in which each storage region divided into four partitions. The partition size of each partition and the segment size are set to optimum values in accordance with the I/O characteristics of the application program. Generally, when setting the segment size large, management information for managing transition from a state of dirty data to clean data is reduced, thus the processing speed increases and the overhead can be reduced. When setting the segment size small, the percent hit rate of the cache memory increases. For example, for the partition used by an application program which consecutively handles large quantities of data for transmitting a moving image or the like, the segment size is set large, and for the partition used by an application program which issues fine random accesses to the database and the like, it is preferred that the segment size be set small.

In an example shown in the same figure, the segment size of the partition P01#0 is set to 16 KB (default size), the segment size of the partition P01#1 to 4 KB, the segment size of the partition P02#0 to 64 KB, and the segment size of the partition P03#0 to 512 KB.

Not only for the mirror-on regions (storage regions P01, P02, P11, P12) but for the mirror-off regions (storage regions P03, P13), the partition size and the segment size for each partition are set to optimum values in accordance with the I/O characteristics of the application program.

As an operation pattern of the storage system 10, for example, the default settings are affected in advance for the partition size, segment size, necessity judgment of dual writing, and the like for each application program, and when the storage system 10 judges the types of the application programs, and the partition size, segment size, necessity judgment of dual writing and the like are set on the basis of a set value which is set to default setting with respect to the application program, so that optimum performance tuning can be performed for the cache memory.

The segment size of each partition can be automatically and dynamically changed in its settings without turning off the power and by an input operation of an operator in accordance with a change of the I/O characteristics of the application program. For example, although the segment size of the partition P01#0 is set to 16 KB default, this can be dynamically enlarged (changed to 64 KB, for example) or narrowed down (changed to 4 KB, for example) in accordance with a change of the I/O characteristics. Further, the settings of the partition size of each partition can be changed without turning off the power by an input operation of an operator or automatically. For the partition used by an application program which handles large quantities of data, the partition size can be set large, and for the partition used by an application program which handles small quantities of data, the partition size can be set small.

As an example where the storage system 10 automatically changes settings of the segment size or partition size, the CPUs 21, 31 monitor the resource conflict state of the cache memory 25, 35, for example, and the segment size or the partition size may be changed so as to be optimum to each application.

Figure 7:
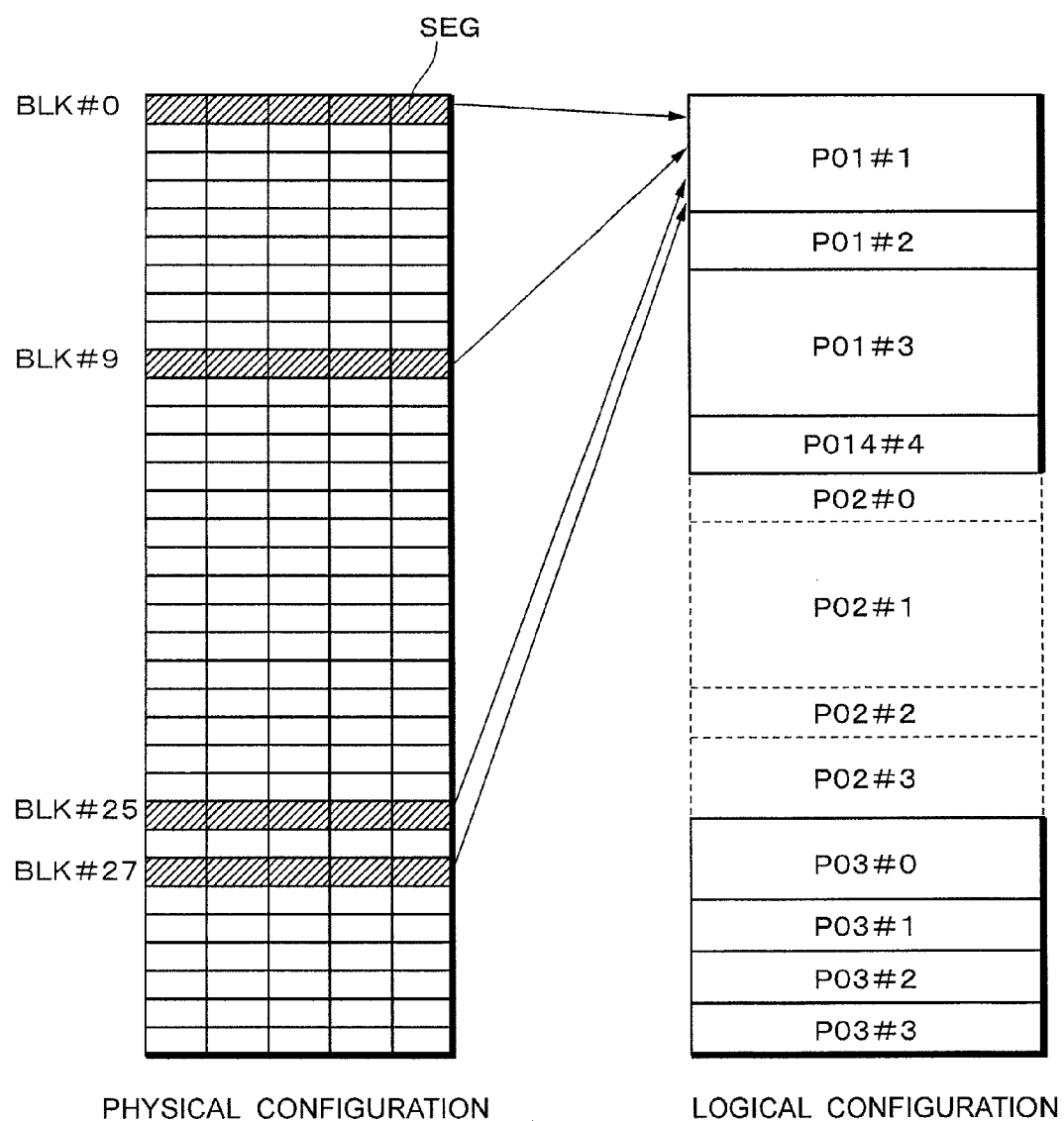
FIG. 7 shows a correspondence of a physical configuration of each partition to a logical configuration.

FIG. 7 shows a correspondence of the physical configuration of each partition to the logical configuration. The cache memory is logically divided into a plurality of partitions by mapping a plurality of blocks (for example, BLK#0, BLK#9, BLK#25, BLK#27) to individual partition (P01#0, for example). Each block is configured by a plurality of segments SEG. By realizing logical division of the partition by mapping the blocks as above, changing the partition size can respond to mapping change of the blocks, thus the movement of the segment can be kept to the minimum. Supposedly, if the physical configuration and logical configuration are equalized, when changing the partition size, the partition boundaries have to be moved little by little sequentially, and thus large quantities of segments may have to be moved.

Figure 8:
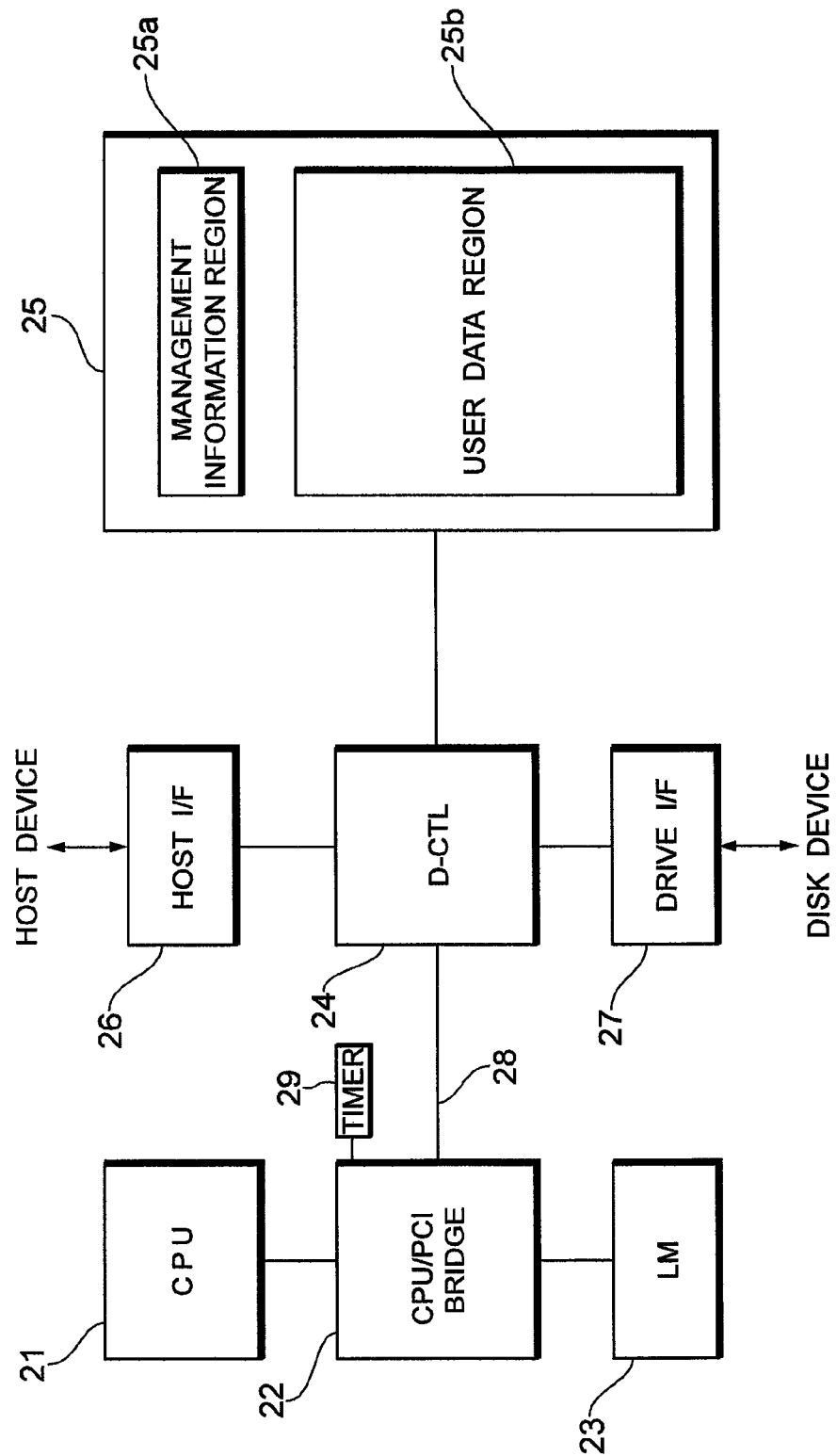
FIG. 8 is a main configuration diagram of a controller.

FIG. 8 shows a main configuration of a controller. Since the hardware with the same symbols as those shown in FIG. 1 indicate the same hardware, the detailed explanations are omitted. The storage region provided by the cache memory 25 is mainly divided into a management information region 25a and a user data region 25b. The user data region 25b is a storage region for temporarily storing user data (cache data), and is divided into a plurality of partitions in accordance with the plurality of application programs as described above. In the management information region 25a, management information required for managing the user data, e.g. data attribute (read data/write data), a logical address of the user data, which is specified by the host device 60, information on free areas in the cache memory, information on priority regarding replacement of the cache data, and other information, are stored.

Figure 9:
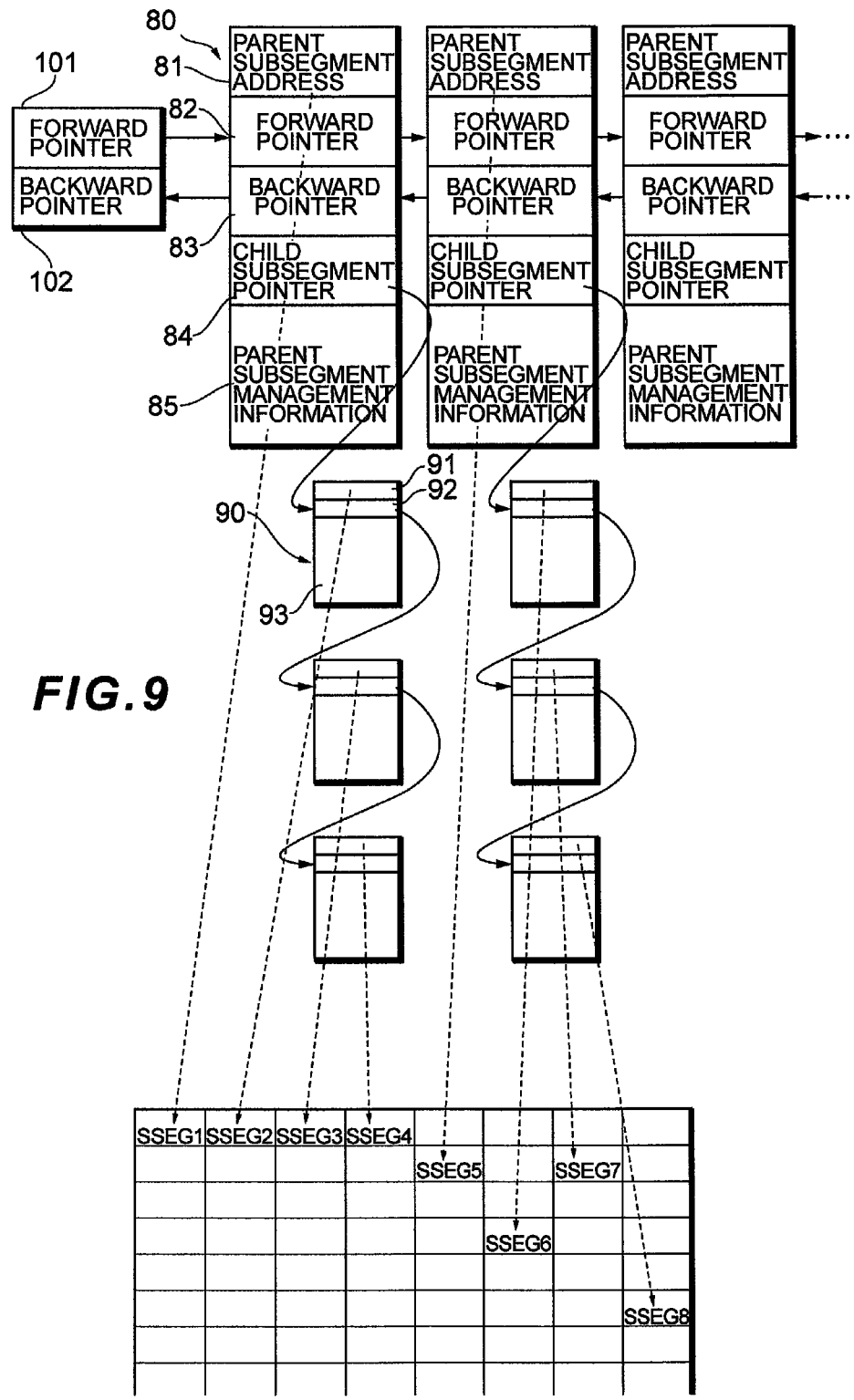
FIG. 9 is a figure which shows a correspondence of a segment to the management information thereof.

FIG. 9 shows a correspondence of the segment to a parent subsegment management block and child subsegment management block. In the present embodiment, the segment is configured by a single or a plurality of subsegments, where the segment size is adjusted by adjusting the number of subsegments configuring the segment. The size of the segment is set to a fixed size beforehand. When configuring a segment from a plurality of subsegments, in this segment a subsegment which is accessed first is called "a parent subsegment", and a subsegment which is accessed second onward is called "a child subsegment". When not distinguishing between the parent subsegment and the child subsegment, the segment is simply called "a segment".

In the same figure, subsegments that are accessed are shown by SSEG1 to SSEG8 indicate in the order of the access. When the size of a subsegment is set to 16 KB default, in order to make the segment size 64 KB, it is necessary to configure the segment by collecting four segments. For example, SSEG1 is taken as a parent subsegment and three subsegments SSEG2 to SSEG4 that follow thereafter are taken as child subsegments to relate them to each other logically, whereby one segment can be configured. Similarly, SSEG5 is taken as a parent subsegment and three subsegments SSEG6 to SSEG8 that follow thereafter are taken as child subsegments to associate them to each other logically, whereby one segment can be configured.

Note that a parent subsegment and child subsegment do not always have to be disposed on the consecutive storage regions, and may be discretely scattered in places.

A parent subsegment management block 80 comprises a parent subsegment address 81, forward pointer 82, backward pointer 83, child subsegment pointer 84, and parent subsegment management information 85. The parent subsegment address 81 shows a position of a parent subsegment managed by the parent subsegment management block 80. The forward pointer 82 indicates the parent subsegment management block 80 in the order of oldest to latest accesses. The backward pointer 83 indicates the parent subsegment management block 80 in the order of latest to oldest accesses. The child subsegment pointer 84 indicates a child subsegment management block 90. In the parent subsegment management information 85 a status of a parent subsegment (dirty/clean/free) or the like is stored. When dirty data and clean data are mixed in the parent subsegment, the statuses are managed by the bitmap information.

The child subsegment management block 90 comprises a child subsegment address 91, forward pointer 92, and child subsegment management information 93. The child subsegment address 91 indicates a position of a child subsegment managed by the child subsegment management block 90. The forward pointer 92 indicates the child subsegment management block 90 in the order of oldest to latest accesses. In the child subsegment management information 93, a status of a child subsegment and the like are stored. When dirty data and clean data are mixed in the child subsegment, the statuses are managed by the bitmap information.

A forward pointer 101 indicates an end of the forward pointer 81 and the backward pointer 102 is indicated by the backward pointer 82.

As above, the parent subsegment management block 80 and the child subsegment management block 90 that are queue managed are, when their statuses are dirty data, queue managed, and when their statuses are clean data, are queue managed as clean data. By logically relating the parent subsegment to the plurality of child subsegment to configure a segment, high speed destaging processing can be achieved, since the child subsegments move when a mother subsegment is moved.

Figure 10:
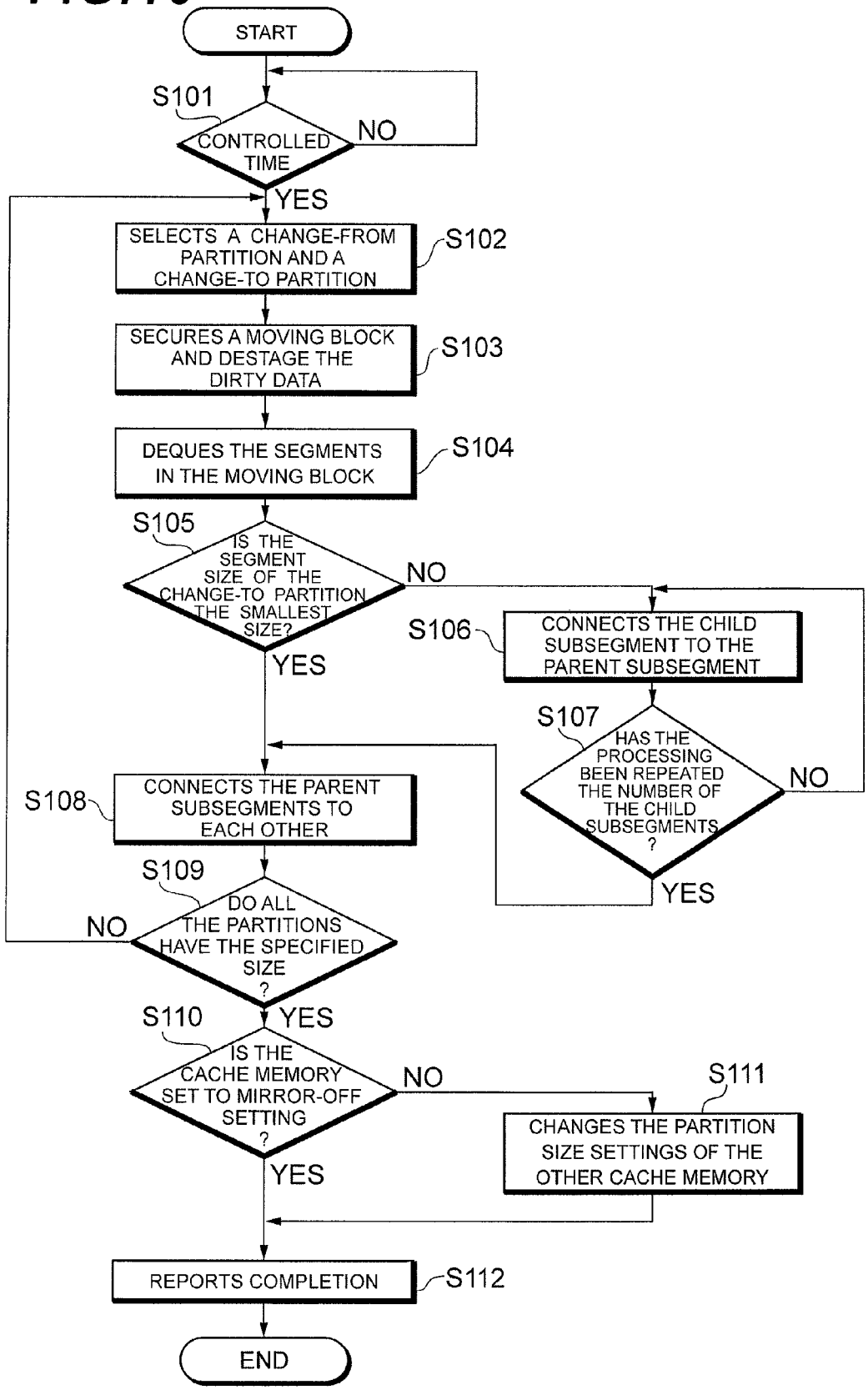
FIG. 10 is a flow chart of a partition size automatic change processing routine.

FIG. 10 shows a flow chart of a partition size automatic change processing routine. Some application programs AP#0, AP#1, . . . , AP#N are required to be operated for 24 hours at any time as usage, and some are increased in the operating rate at a certain period of time. The load is different time to time. In order to appropriately bring the performance of the application program into action, it is preferred that the partition size be changed in accordance with the load fluctuation of each period of time. For example, in the night time when a certain application program is not operated, the partition size that other application program use is increased.

When the partition size automatic change processing routine is called, the CPU 21 checks whether or not the current time the timer 29 ticks is equivalent to a timer controlled time (S101). When the current time reaches the timer controlled time (S101; YES), the CPU 21 selects a partition having a partition size larger than the partition size specified beforehand by an operator as a change-from partition, and a partition having a partition size smaller than the partition size specified by the operator as a change-to partition (S102).

For example, suppose that the size of the partition P01#0 is set to 10% of a user data region 25b and the size of the partition P01#1 is set to 5% of the user data region 25b. In order to change the size of the partition P01#1 to 7%, it is only necessary to move 2-percent block to the partition P01#1 from the partition P01#0. At this time the partition P01#0 is the change-from partition and the partition P01#1 is the change-to partition. However, when a plurality of change-from partitions are present, a partition used by the application program having the lowest operating rate may be preferentially selected as the change-from partition at that period of time.

Next, the CPU 21 secures a block which moves from the change-from partition to the change-to partition, destages the dirty data in this block (S103), and dequeues the parent subsegment management block and child subsegment management block that manage the subsegment inside the block (S104).

Thereafter, the CPU 21 checks whether or not the segment size of the change-to partition is the smallest size (subsegment size) (S105). When the segment size of the change-to partition is not the smallest size (S105; NO), the CPU 21 reconfigures queue management of the parent subsegment management block 80 and the child subsegment management lock 90 such that the child subsegment is connected to the parent subsegment. (S106), repeats this reconfiguration processing the number of the child subsegments (S107), thereby conforming the segment size of the block moving from the change-from partition to the change-to partition to the segment size of the change-to partition.

When the segment size is not the smallest size (S105; NO), or when the process of S106 is completed the number of child subsegment (S107; YES), the CPU 21 reconfigures queue management of the parent subsegment management block 80 so that the parent subsegments are connected to each other (S108), and this reconfiguration process is repeated until all the partitions have the specified size (S109).

Next, the CPU 21 checks whether or not the cache memory 25 is set to mirror-off setting (S110), and, when it is not set to mirror-off setting (S110; NO), sends an instruction to the CPU 31 so as to change the partition size as with the mirror-on region of the cache memory 35 (S111). Accordingly, the partition sizes of the mirror-on regions of the cache memory 25, 35 become equal. On the other hand, when the cache memory 25 is set to mirror-off setting (S110; YES), it is not necessary to change the partition size or the like of the cache memory 35, thus the CPU 21 sends a report of completion to the operator (S112) and leaves the routine.

Figure 11:
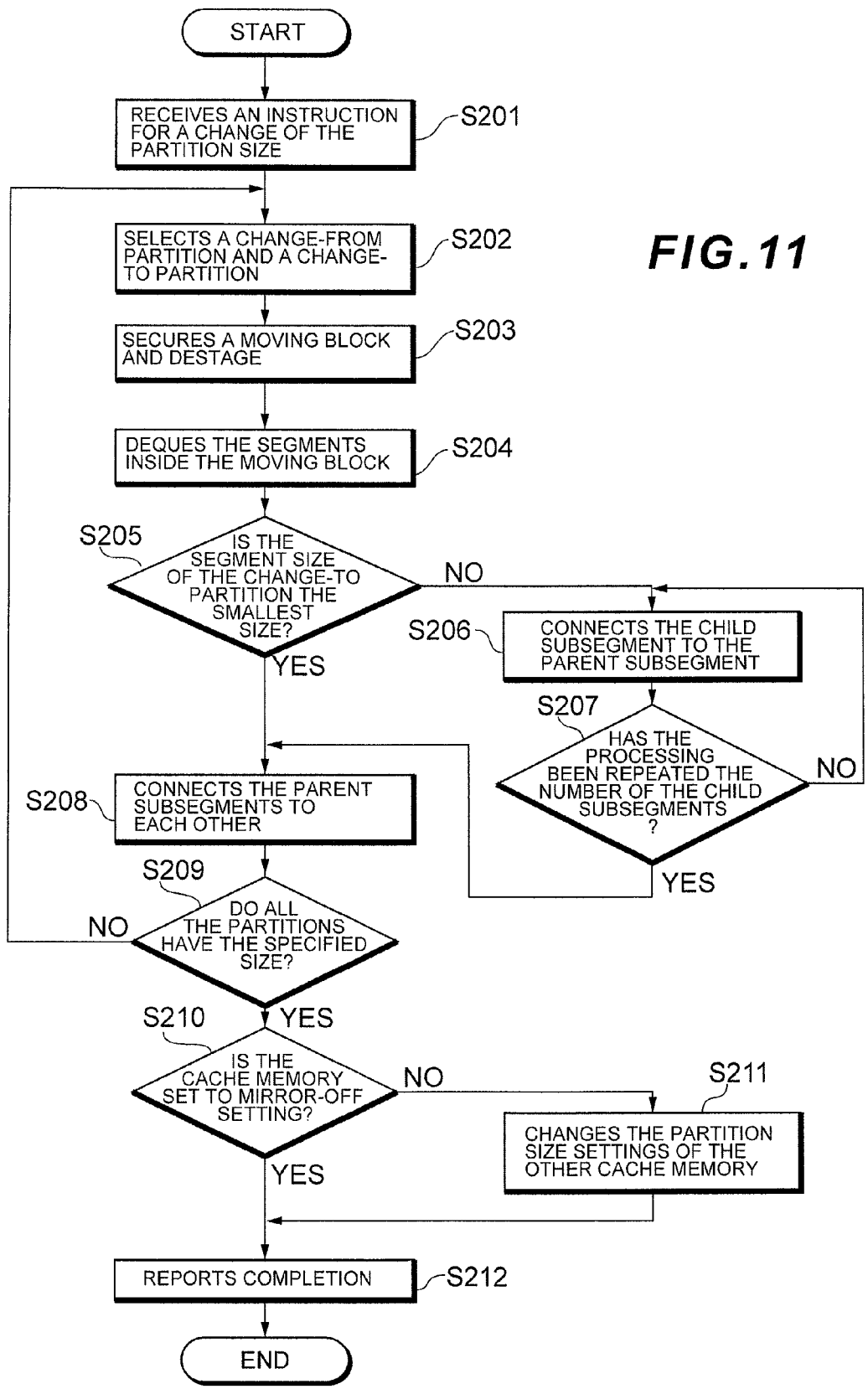
FIG. 11 is a flow chart of a partition size manual change processing routine.

FIG. 11 illustrates a flow chart of a partition size manual change processing routine. The operator can operate the management terminal 70 to instruct the storage system 10 to change the partition size. For example, the operator monitors a load fluctuation of each application program, the load fluctuation being displayed on the display of the management terminal 70, and can assign an optimum partition size to each application.

When the partition size manual change process routine is called, the CPU 21 receives an instruction for a change of the partition size from the operator (S201). Then the CPU 21 selects a partition having a partition size larger than the partition size specified beforehand by an operator as a change-from partition, and a partition having a partition size smaller than the partition size specified by the operator as a change-to partition (S202).

Next, the CPU 21 secures a block which moves from the change-from partition to the change-to partition, destages the dirty data in this block (S203), and dequeues the parent subsegment management block and child subsegment management block that manage the subsegment inside the block (S204).

Thereafter, the CPU 21 checks whether or not the segment size of the change-to partition is the smallest size (subsegment size) (S205). When the segment size of the change-to partition is not the smallest size (S205; NO), the CPU 21 reconfigures queue management of the parent subsegment management block 80 and the child subsegment management lock 90 such that the child subsegment is connected to the parent subsegment. (S126), repeats this reconfiguration processing the number of the child subsegments (S207), thereby conforming the segment size of the block moving from the change-from partition to the change-to partition to the segment size of the change-to partition.

When the segment size is not the smallest size (S205; NO), or when the process of S206 is completed the number of child subsegment (S207, YES), the CPU 21 reconfigures queue management of the parent subsegment management block 80 so that the parent subsegments are connected to each other (S208), and this reconfiguration process is repeated until all the partitions have the specified size (S209).

Next, the CPU 21 checks whether or not the cache memory 25 is set to mirror-off setting (S210), and, when it is not set to mirror-off setting (S210; NO), sends an instruction to the CPU 31 so as to change the partition size as with the mirror-on region of the cache memory 35 (S211). On the other hand, when the cache memory 25 is set to mirror-off setting (S210; YES), it is not necessary to change the partition size or the like of the cache memory 35, thus the CPU 21 sends a report of completion to the operator (S212) and leaves this routine.

Figure 12:
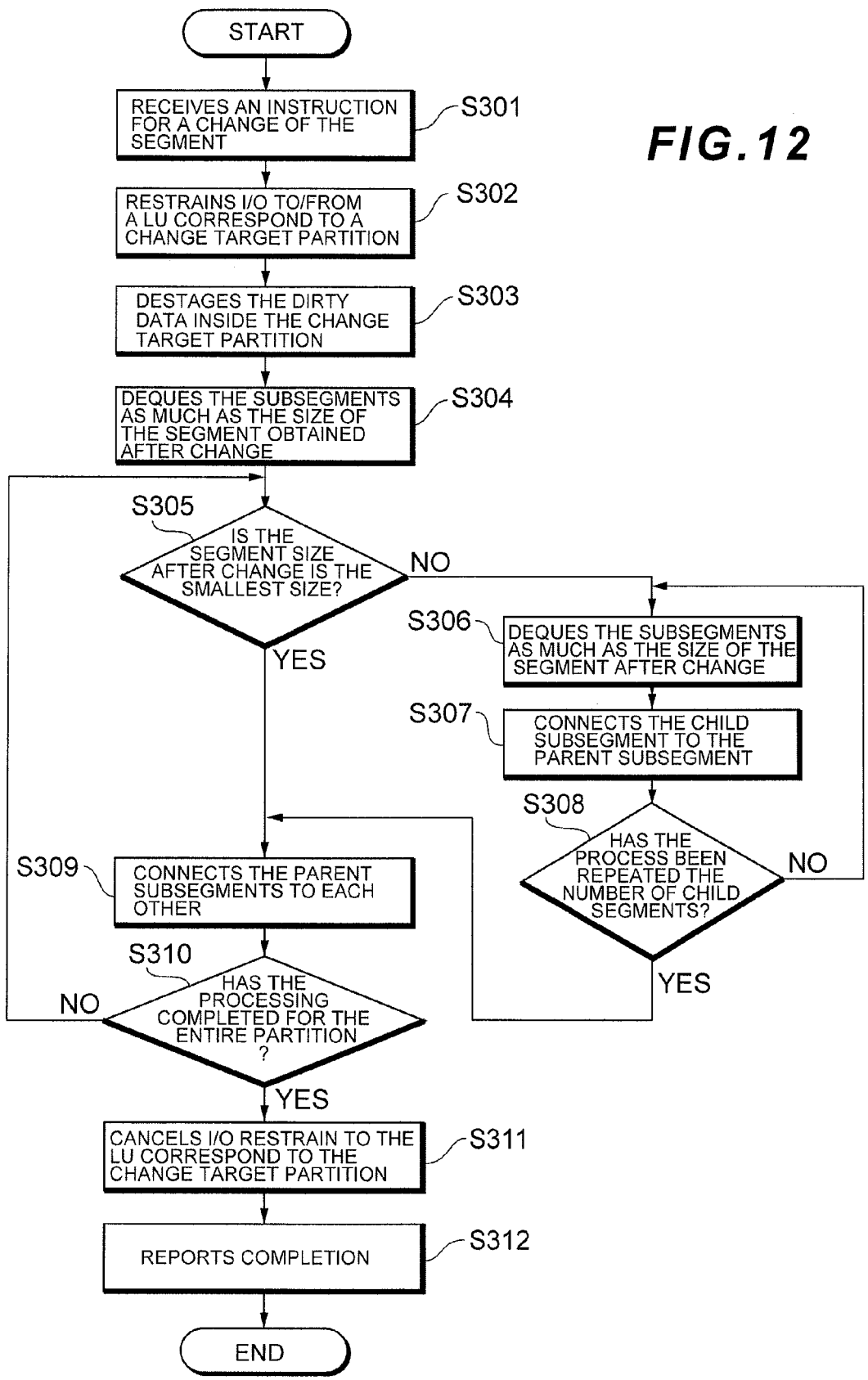
FIG. 12 is a flow chart of a segment size change processing routine.

FIG. 12 illustrates a flow chart of a segment size change process routine. As described above, the segment size is determined according to the I/O characteristics of the application program, and it is appropriate to operate with the segment size which is set to default setting for every individual application program. However, it is preferred that the segment size be configured so that it can be appropriately changed so as to be able to correspond to a fluctuation or the like of the I/O characteristics of the application program. The operator can operate the management terminal 70 to instruct to the storage system 10 to change the segment size.

When the segment size change process routine is called, the CPU 21 receives an instruction for a change of the partition size from the operator (S301). The instruction for a change of the partition size includes a target partition for change and a segment size obtained after change. In preparation for a change work of the partition size, the CPU 21 restrains input/output to/from a logical volume corresponded to a change target partition (S302), and destages the dirty data inside the change target partition (S303). After completing destage, the CPU 21 dequeues the parent subsegment management block and the child subsegment block as much as the size of the segment obtained after change (S304).

Next, the CPU 21 checks whether or not the segment size after change is the smallest size (subsegment size) (S305). When the segment size after change is not the smallest size (S305; NO), the CPU 21 secures a plurality of subsegments as much as the size of the segment after change (S306). Then the CPU 21 reconfigures queue management of the parent subsegment management block 80 and child subsegment management block 90 so that the parent subsegment is connected to the child subsegment (S307), and repeats this reconfiguration processing the number of child subsegments (S308), thereby adjusting the subsegment size to a specified segment size.

When the segment size is not the smallest size (S305; NO), or when the process of S307 is completed the number of child subsegment (S308, YES), the CPU 21 reconfigures queue management of the parent subsegment management block 80 so that the parent subsegments are connected to each other (S309), and repeats this reconfiguration processing until the entire charge target partition becomes the specified segment size (S310). Then the CPU 21 cancels I/O retain to the logical volume corresponded to the change target partition (S311), sends a report of completion to the operator (S312) and leaves the routine.

Note that, when changing the segment size, it is not always necessary to destage all the dirty data of the change target partition and then change the segment size. For example, a part of the dirty data within the change target partition may be destaged, cancel the I/O restrain to the logical volume when a certain level of the subsegment can be secured, and perform the change process of the segment size in the background in parallel with the I/O processing for the logical volume.

Further, as another means, an I/O stop time may be reduced by applying a write-through system, for example, without restraining the I/O for the logical volume until destage of the change target partition is completed. Here, the write-through system means a system in which write data is not written into the cache memory 25, 35 but directly written into the disk device 40.

Figure 13:
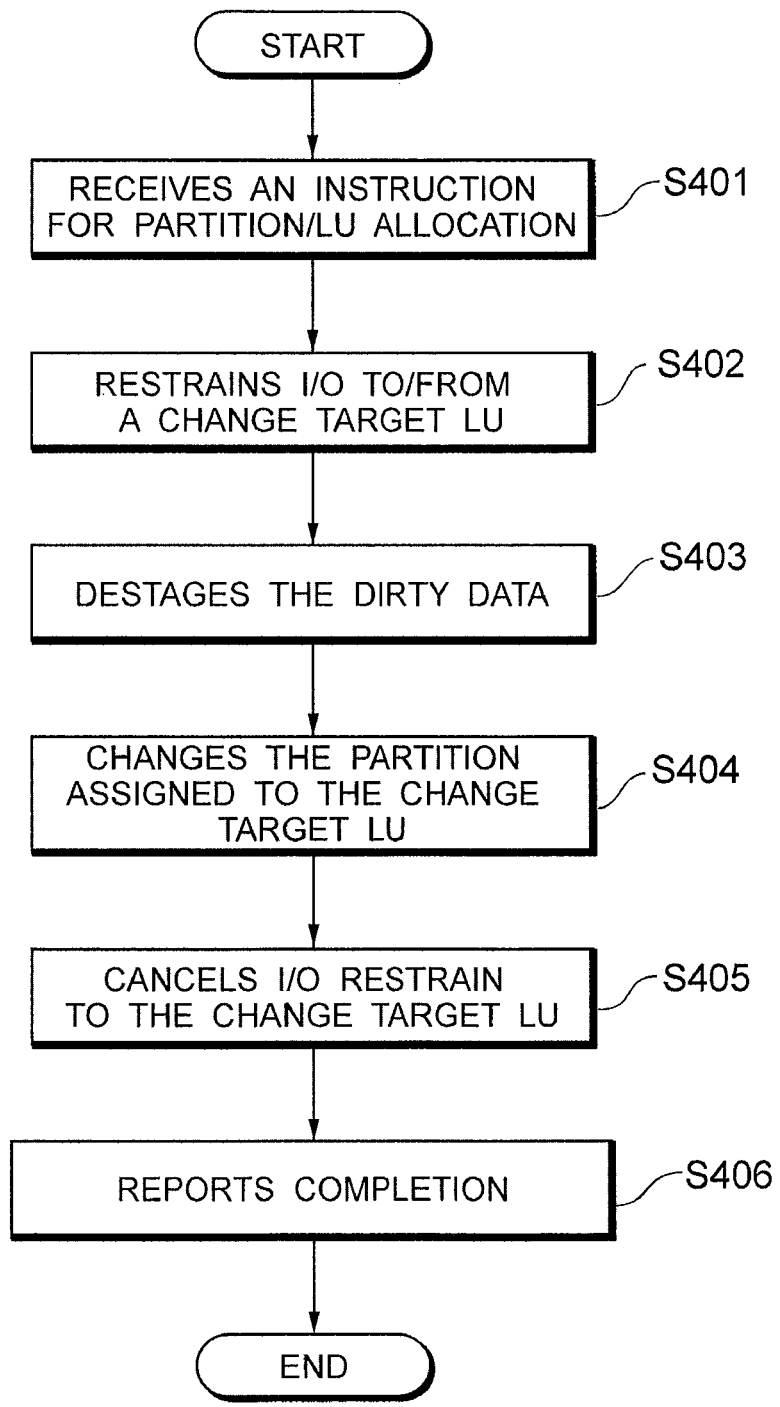
FIG. 13 is a flow chart of a partition/LU allocation change processing routine.

FIG. 13 is a flow chart of a partition/LU allocation change process. The operator can instruct the storage system 10 to change the allocation of the logical volume to the partition by operating the management terminal 70.

When the partition/LU allocation change processing routine is called, the CPU 21 receives from the operator an instruction for change of allocation of a logical volume to the partition (S401). Then, in preparation for a partition/LU allocation change work, the CPU 21 restrains input/output to/from a change target logical volume (S402), and destages the dirty data on the cache memory 25, 35 assigned to the change target logical volume (S403).

Next, the CPU 21 changes the partition assigned to the change target logical volume to a partition specified by the operator (S404). Then, the CPU 21 cancels I/O restrain to the change target logical volume (S405), sends a report of completion to the operator (S406) and leaves this routine.

FIG. 14 to FIG. 19 are screen images displayed on the management terminal 70 when performing reference or change of a partition size, reference or change of a segment size, reference or change of assignment of a logical volume to a partition, and the like. Hereinbelow, these display screens are explained.

FIG. 14 illustrates a display example of a unit screen. The operator can perform reference or change of various set values on this unit screen. Displayed on a tree on the left side of the unit screen are a "Cache Partition" object, below which are displayed "partition" object and "logical unit" object. When performing reference or change of the partition size, or reference or change of the segment size, the operator selects the "partition" object. Then, the image screen makes the transition from FIG. 14 to FIG. 15. On the other hand, when referring or changing assignment of the logical volume to the partition, the operator selects the "logical unit" object. Then, the screen image makes the transition from FIG. 14 to FIG. 17.

FIG. 15 illustrates a partition reference/change screen. In the upper right corner of the screen is displayed "current value", and in the lower right corner of the screen is displayed "set value". The operator clicks a "change" button, whereby the set values of a cache total space, cache free space, controller number of each partition, partition size, segment size, and the like can be changed. When the operator clicks the "change" button, the screen image makes the transition from FIG. 15 to FIG. 16.

FIG. 16 illustrates a partition change screen. With this screen the operator can change the name of each partition, controller number, partition size, and segment size. Furthermore, by clicking an "add" button, a new partition can be added. By clicking a "delete" button, a partition can be deleted. The operator inputs a new "set value" for the partition size, segment size, or the like, and clicks an "OK" button (this operation is equal to the partition size change instruction (S201) or segment size change instruction (S301) as described above), whereby a new "set value" is reflected the device.

FIG. 17 illustrates a setting screen for assigning a partition to a logical volume. In this screen is displayed a state in which a partition is assigned to a logical volume at the present time. In the example shown in the figure, a partition called "Mas-tor0" is assigned to LUN0000, and a partition called "Sample" is assigned to LUN0001. When the operator clicks the "change" button, the screen image makes the transit from FIG. 17 to FIG. 18.

FIG. 18 illustrates a partition assignment change screen. When the operator clicks a "change assignment" button, the screen image makes the transition from FIG. 18 to FIG. 19.

FIG. 19 illustrates a partition specifying screen. In a "logical unit number" on this screen is displayed a set target logical volume. The operator selects, from pull-down menu "Cache partition", a partition wished to be assigned to the logical volume, and when clicking an "OK" button (this operation is equal to the partition allocation change instruction (S401) described above), a new "set value" is reflected in the device.

Figure 20:
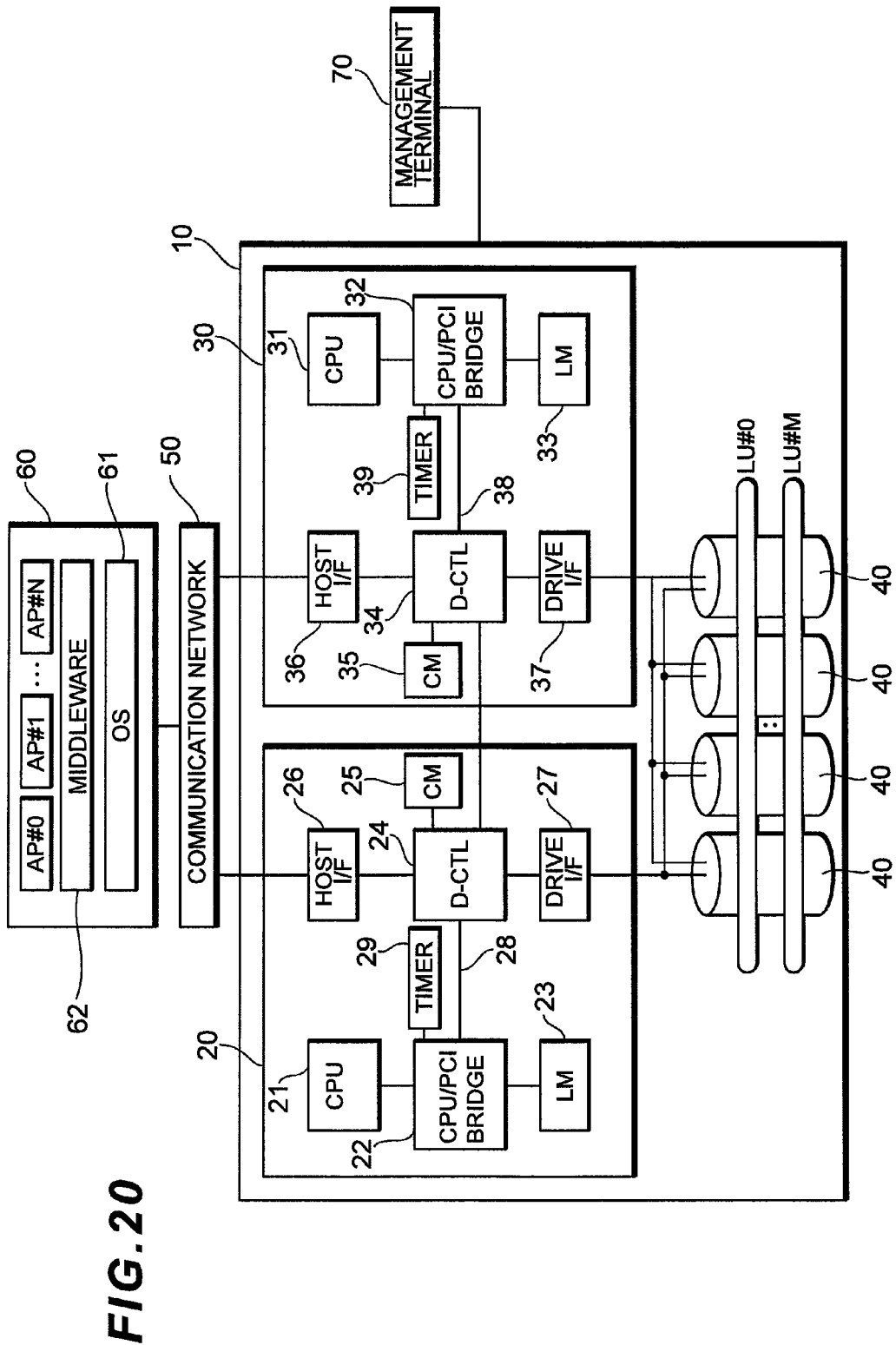
FIG. 20 is a block diagram which shows a main configuration of the storage system.

Note the above-described explanation has exemplified a configuration in which performance tuning for the cache memory 25, 35 (partition allocation, partition size setting, segment size setting, necessity judgment of dual writing setting, setting or change of allocation of a logical volume to a partition) is performed by an operation of the management terminal 70 by the operator. However, a configuration may be made such that, as shown in FIG. 20, for example, a middleware 62 installed in the host device 60 monitors the I/O characteristics of the application programs AP#0, AP#1, . . . , AP#N, and, in response to a fluctuation or the like of the I/O characteristics, the operator gives the storage system 10 instructions for partition allocation, partition size setting, segment size setting, necessity judgment of dual writing, setting or change of assignment of a logical volume to a partition, and the like, to perform optimum performance tuning of the cache memory 25, 35 on the individual application program AP#0, AP#1, . . . , AP#N.

According to the present embodiment, by assigning the plurality of partitions exclusively to the plurality of logical volumes respectively, a resource conflict between the logical volumes assigned exclusively to each application program can be inhibited and performance tuning for an optimum cache memory can be performed.

Moreover, even when the performance characteristics of the disk drive 40 are different, by assigning the plurality of partitions to the plurality of logical volumes respectively, a resource conflict of the cache memory 25, 35 due to the difference in the performance characteristics of the disk drive 40 can be inhibited and performance tuning for a optimum cache memory can be performed.

[Embodiment 2]

Figure 21:
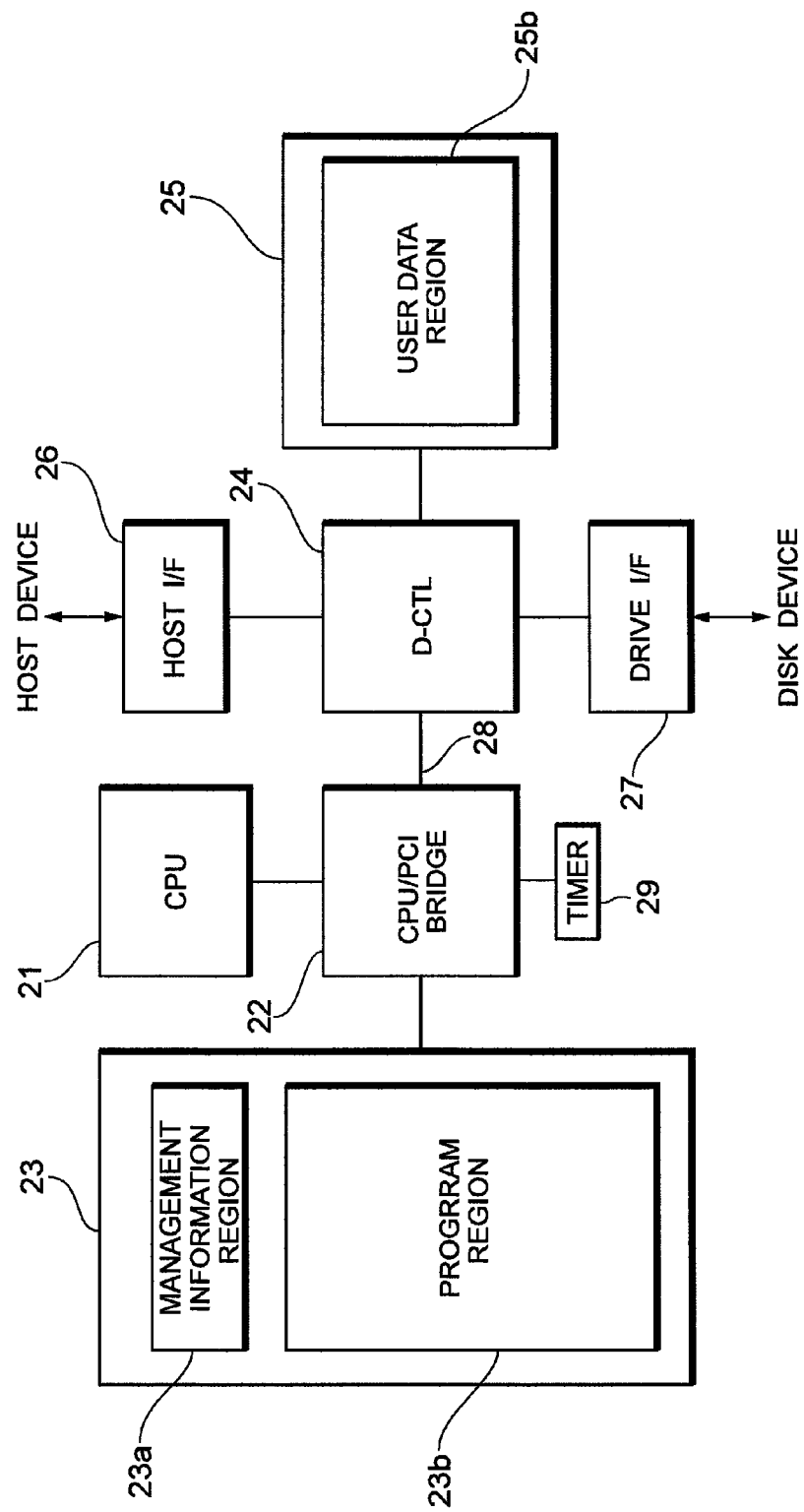
FIG. 21 is a block diagram which shows a main configuration of the storage system.

FIG. 21 shows a main configuration of the storage system according to the present embodiment. Since the hardware with the same symbols as those shown in FIG. 1 indicate the same hardware, the detailed explanations are omitted.

The local memory 23 is provided with, in addition to the program region 23b which stores the micro program of the CPU 21, a management in formation region 23a for store management information required in management of the user data, such as data attributes (read data/write data), a logical address of the user data, which is specified by the host device 60, free area information on the cache memory, and information of the priority related to the cache data replacement. On the other hand, although the cache memory 25 is provided with the user data region 25b for temporarily storing the user data (cache data), it is not provided with the management information region for managing the user data.

When a write access is made from the host device 60 to the storage system 10, the CPU 21 refers to the management information region 23a of the local memory 23, searches for a free area in the user data region 25b of the cache memory 25, and writes write data into the free region. Further, when a read access is made from the host device 60 to the storage system 10, the CPU 21 refers to the management information region 23a of the local memory 23 and performs cache hit judgment. When the management information region 25a is in the cache memory 25 as in Embodiment 1, it was difficult to make a high speed access since a memory access has to be made through the PCI bus 28. However, in the present embodiment, when the management information region 23a is in the local memory 23, a high speed access can be made, thus overhead associated with the memory access can be reduced.

Note that the CPU 21 may have mounted therein the local memory 23 so as to have a configuration in which the local memory 23 is provided therein with the management information region 23a.

[Embodiment 3]

Figure 22:
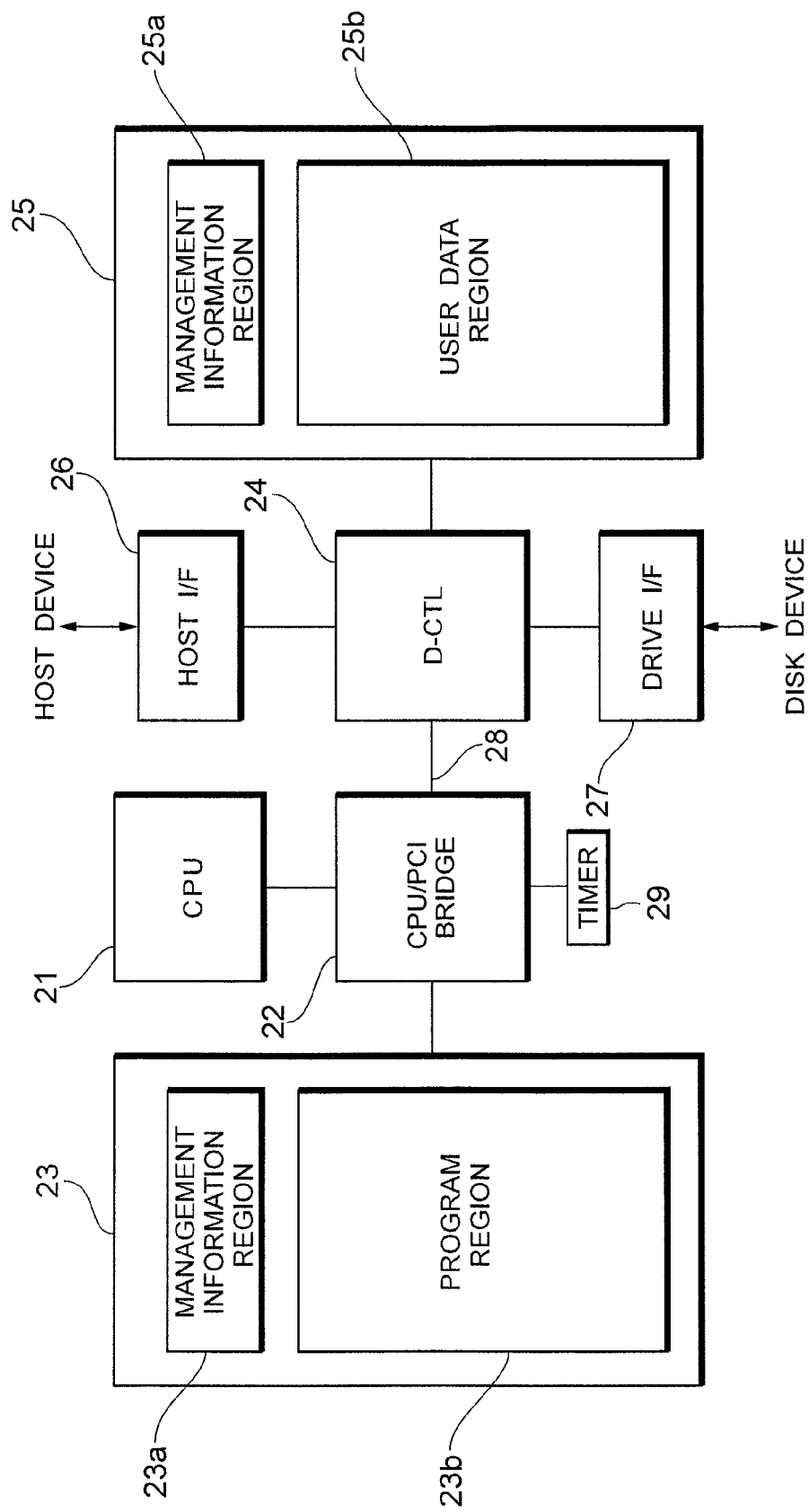
FIG. 22 is a block diagram which shows a main configuration of the storage system.

FIG. 22 shows a main configuration of the storage system according to the present embodiment. Since the hardware with the same symbols as those shown in FIG. 1 or FIG. 21 indicate the same hardware, the detailed explanations are omitted.

The local memory 23 and the cache memory 25 are respectively provided with the management information region 23a, 25a for storing the management information of the cache data, wherein binary management information is managed. The CPU 21 refers to the management information region 23a of the local memory 23 with regard to a write access or read access from the host device 60, thereby searching a free area in the user data region 25b or performing cache hit judgment. One the CPU 21 writes the write data into the free area of the user data region 25b with regard to the write access from the host device 60, the CPU 21 updates the management information stored in both the management information regions 23a, 25a. Updating the management information may be performed by the CPU 21, or may be performed by the data transfer control section 24 in accordance with the instructions of the CPU 21.

FIG. 23 shows a flow chart for a recovery processing routine in case of a power failure. When a power failure occurs suddenly on the storage system 10, the management information stored in the volatile local memory 23 is lost, but the management information of the cache memory 25 that is supported by power backup is remained without being lost. In the case of failure recovery, it is preferred that the power be turned on again, which is a trigger to copy the management information in the cache memory 25 to the local memory 23, thereby restoring the lost management information. During this restoration process, the storage system 10 may temporarily stop the I/O process from the host device 60, perform I/O acceptance queuing only and stop I/O execution, or perform an I/O process from the host device 60 by referring to the management information region 25a.

In the recovery processing routine in case of a power failure, when the power is turned on (S501), the CPU 21 checks whether or not the previous system stop is due to a power failure (S502). When the system is stopped because of a power failure (S502; YES), the CPU 21 checks whether or not the cache memory 25 is nonvolatile (S503). When the cache memory 25 is nonvolatile because it is supported by power back up, or for other reasons (S503; YES), the management information in the cache memory 25 is copied to the local memory 23 (S504).

On the other hand, when the previous system stop is not due to a power failure, and when the management information is not lost (S502; NO), the cache memory 25 is initialized as per normal since there is no problem in the system operation (S505). When the cache memory 25 is volatile and the management information is lost (S503; NO), the management information cannot be restored, thus, in this case as well, the cache memory 25 is initialized as per normal (S505). Then, the CPU 21 prepares for an I/O process from the host device 60 (S506) and starts an I/O process (S507).

According to the present embodiment, the management information of the cache data is obtained from the local memory 23 to which a high speed access can be made, and overhead of the memory access is reduced, and at the same time, regarding loss of the management information in case of a power failure, the management information of the local memory 23 is restored based on the management information kept in the nonvolatile cache memory 25, thus the disaster tolerance of the system can be improved.

What is claimed is:

1. A storage system, comprising:
a controller managing a cache memory, the cache memory being logically divided into a first partition and a second partition, the first partition being used for storing data read/written by a first application program from/to a first logical volume, and the second partition being used for storing data read/written by a second application program from/to a second logical volume; and
a plurality of disk drives having a plurality of first type disk drives configuring the first logical volume and a plurality of second type disk drives configuring the second logical volume, a first performance characteristic of the plurality of the first type disk drives being different from a second performance characteristic of the plurality of second type disk drives,
wherein the controller is configured to set a partition size of the first partition of the cache memory and a partition size of the second partition of the cache memory to values in accordance with differences between the first performance characteristic and the second performance characteristic to enable performance tuning of the cache memory.

2. The storage system according to claim 1, wherein:
I/O characteristics of the second application program are different from I/O characteristics of the first application program.

3. The storage system according to claim 1, wherein:
in order to change the first and second partition sizes, the controller automatically moves a portion of the first partition to the second partition.

4. The storage system according to claim 1, wherein:
the first type disk drives are FC (Fibre Channel) disk drives.

5. The storage system according to claim 1, wherein:
the second type disk drives are serial ATA disk drives.

6. The storage system according to claim 1, wherein:
the first type disk drives are semiconductor memory.

7. The storage system according to claim 1, wherein:
the first and second partition sizes are changed by values that are set by a management terminal.

8. The storage system according to claim 1, wherein:
the first application program issues random accesses, and the second application program is for streaming.

9. A method of managing a storage system, comprising:
dividing a cache memory logically into a first partition and a second partition, the first partition being used for storing data read/written by a first application program from/to a first logical volume, and the second partition being used for storing data read/written by a second application program from/to a second logical volume;
configuring the first logical volume with a plurality of first type disk drives and configuring the first second volume with a plurality of second type disk drives, a first performance characteristic of the plurality of the first type disk drives being different from a second performance characteristic of the plurality of second type disk drives; and setting a partition size of the first partition of the cache memory and a partition size of the second partition of the cache memory in accordance with differences between the first performance characteristic and the second performance characteristic to enable performance tuning of the cache memory.

10. The method according to claim 9, wherein:

I/O characteristics of the second application program are different from I/O characteristics of the first application program.

11. The method according to claim 9, further comprising:

moving a portion of the first partition to the second partition in order to change the first and second partition sizes.

12. The method according to claim 9, wherein:

the first type disk drives are FC (Fibre Channel) disk drives.

13. The method according to claim 9, wherein:

the second type disk drives are serial ATA disk drives.

14. The method according to claim 9, wherein:

the first type disk drives are semiconductor memory.

15. The method according to claim 9, wherein:

the first and second partition sizes are changed by values that are set by a management terminal.

16. The method according to claim 9, wherein:

the first application program issues random accesses, and the second application program is for streaming.

* * * * *